United States Patent

Baghel et al.

(10) Patent No.: US 9,609,680 B2
(45) Date of Patent: Mar. 28, 2017

(54) SIGNALING FLOWS AND BUFFER STATUS REPORT FOR A GROUP IN DEVICE-TO-DEVICE BROADCAST COMMUNICATION

(71) Applicant: QUALCOMM Incorporated, San Diego, CA (US)

(72) Inventors: Sudhir Kumar Baghel, Bridgewater, NJ (US); Saurabha Rangrao Tavildar, Jersey City, NJ (US); Shailesh Patil, North Wales, PA (US); Kapil Gulati, Long Branch, NJ (US); Haris Zisimopoulos, London (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/608,819

(22) Filed: Jan. 29, 2015

(65) Prior Publication Data

US 2015/0271860 A1 Sep. 24, 2015

Related U.S. Application Data

(60) Provisional application No. 61/955,150, filed on Mar. 18, 2014, provisional application No. 62/038,568, filed on Aug. 18, 2014.

(51) Int. Cl.
*H04M 11/00* (2006.01)
*H04W 76/02* (2009.01)
(Continued)

(52) U.S. Cl.
CPC ........... *H04W 76/023* (2013.01); *H04W 4/08* (2013.01); *H04W 36/0016* (2013.01);
(Continued)

(58) Field of Classification Search
CPC . H04W 36/0055; H04W 60/04; H04W 4/005; H04W 72/04
(Continued)

(56) References Cited

U.S. PATENT DOCUMENTS 5,233,643 A * 8/1993 Naeini ................ H04B 7/2643
370/329
5,327,574 A * 7/1994 Monma ............. H04W 36/0055
455/403
(Continued)

OTHER PUBLICATIONS

3GPP, "3rd Generation Partnership Project; Technical Specification Group Services and System Aspects; Study on architecture enhancements to support Proximity-based Services (ProSe) (Release 12)," 3GPP TR 23.703 v12.0.0 (Feb. 2014), Feb. 2015, 324 pgs., 3rd Generation Partnership Project, Valbonne, FR.
(Continued)

*Primary Examiner* — William D Cumming
(74) *Attorney, Agent, or Firm* — Holland & Hart LLP

(57) ABSTRACT

Methods, systems, and devices are described for device-to-device (D2D) wireless communication. A device may transmit an initiation message to a base station indicating that the device desires to initiate a D2D communication session. The device may then receive a response from the base station that includes parameters for configuration of the D2D session. When it has data to send to another device, the device may transmit buffer status report (BSR) to the base station. The base station may respond with a grant of D2D scheduling assignment (SA) configured according to the previously sent parameters. For example, the message may be scrambled with a D2D temporary identity sequence. In some cases, the device may transmit a group identification (ID) code to the base station, and the group ID may be associated with an index, so an SA for that group can be reference by index.

27 Claims, 15 Drawing Sheets

(51) Int. Cl.
*H04W 4/08* (2009.01)
*H04W 36/00* (2009.01)
*H04W 72/04* (2009.01)
*H04W 88/10* (2009.01)
*H04W 76/00* (2009.01)
*H04L 29/06* (2006.01)
*H04W 12/08* (2009.01)

(52) U.S. Cl.
CPC ....... *H04W 72/0406* (2013.01); *H04L 63/104* (2013.01); *H04W 12/08* (2013.01); *H04W 76/002* (2013.01); *H04W 88/10* (2013.01)

(58) Field of Classification Search
USPC ............... 455/403, 426.1, 450; 370/336, 329
See application file for complete search history.

(56) References Cited

U.S. PATENT DOCUMENTS

| | | | | |
|---|---|---|---|---|
| 5,568,654 | A * | 10/1996 | Fukawa | ............... H04W 60/04 342/147 |
| 8,918,111 | B2 * | 12/2014 | Shin | ..................... H04W 4/005 455/450 |
| 2011/0268006 | A1 | 11/2011 | Koskela et al. | |
| 2011/0282989 | A1 | 11/2011 | Geirhofer et al. | |
| 2012/0106517 | A1 * | 5/2012 | Charbit | ................ H04W 72/04 370/336 |
| 2013/0150061 | A1 | 6/2013 | Shin et al. | |
| 2013/0208584 | A1 | 8/2013 | Kim et al. | |
| 2013/0223352 | A1 | 8/2013 | Sartori et al. | |
| 2013/0250771 | A1 | 9/2013 | Yu et al. | |

OTHER PUBLICATIONS

Ericsson, "Resource Allocation for D2D Transmitters in Coverage," 3GPP TSG-RAN WG2 #85, Prague Czech Republic, Feb. 10-14, 2014 5 pgs., Tdoc R2-140625, 3rd Generation Partnership Project.
ETRI, "Overall Procedures of Fully Scheduled Allocation," 3GPP TSG-RAN WG2 #83bis, Ljubljana, Slovenia, Oct. 7-11, 2013, 6 pgs., R2-133270, 3rd Generation Partnership Project.
ISA/EPO, International Search Report and Written Opinion of the International Searching Authority, Int'l Appl. No. PCT/US2015/013833, Jun. 8, 2015, European Patent Office, Rijswijk, NL, 12 pgs.

* cited by examiner

SIGNALING FLOWS AND BUFFER STATUS REPORT FOR A GROUP IN DEVICE-TO-DEVICE BROADCAST COMMUNICATION

CROSS REFERENCES

The present application for patent claims priority to U.S. Provisional Patent Application No. 61/955,150 by Baghel et al., entitled "Signaling Flows and Buffer Status Report for a Group In Device-To-Device Broadcast Communication," filed Mar. 18, 2014, and U.S. Provisional Patent Application No. 62/038,568 by Baghel et al., entitled "Signaling Flows and Buffer Status Report for a Group In Device-To-Device Broadcast Communication," filed Aug. 18, 2014, and assigned to the assignee hereof.

BACKGROUND

Field of the Disclosure

The present disclosure, for example, relates to wireless communication systems, and more particularly to techniques for signaling flows and buffer status report for a group in device-to-device broadcast communication.

Description of the Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices or other user equipment (UE) devices. Base stations may communicate with UEs on downstream and upstream links. Each base station has a coverage range, which may be referred to as the coverage area of the cell. Device-to-device (D2D) communications involve direct wireless communications between UEs either within or beyond the coverage area of a base station. D2D communications may be facilitated by scheduling transmissions from a base station if the devices are within a coverage area. In some cases, D2D communications are utilized by public safety officers such as police, fire and rescue teams, for example.

In some cases, a device or group of devices may engage in D2D communications while within the service area of a network base station. In such cases, it may be appropriate for the device(s) engaging in a D2D communications session to coordinate wireless resources for the session with the base station. D2D communication sessions that are not coordinated with a base station may interfere with other transmissions in the area, and may require increased signaling between devices for synchronization and scheduling. In some cases, D2D devices that have not coordinated with a serving base station may experience interruptions in service that may interfere with a public safety operation.

SUMMARY

The described features generally relate to one or more improved systems, methods, and/or apparatuses for device-to-device (D2D) wireless communication. A device may transmit an initiation message to a base station indicating that the device desires to initiate a D2D communication session. The device may then receive a response from the base station that includes parameters for configuration of the D2D session. When it has data to send to another device, the first device may transmit buffer status report (BSR) to the base station. The base station may respond with a grant of D2D scheduling assignment (SA) configured according to the previously sent parameters. For example, the message may be scrambled with a D2D temporary identity sequence. In some cases, the device may transmit a group identification (ID) code to the base station, and the group ID may be associated with an index, so an SA for that group can be reference by index.

A method of wireless communication is described, comprising transmitting a first message from a device to a first base station indicating that the device desires to initiate a D2D communication session, receiving a second message from the first base station comprising at least one D2D configuration parameter, transmitting a third message to the first base station, the third message indicating that there is data to transmit for the D2D communication session, and receiving a fourth message from the first base station that is transmitted according to the at least one D2D configuration parameter.

An apparatus for wireless communication is described, comprising means for transmitting a first message from a device to a first base station indicating that the device desires to initiate a D2D communication session, means for receiving a second message from the first base station comprising at least one D2D configuration parameter, means for transmitting a third message to the first base station, the third message indicating that there is data to transmit for the D2D communication session, and means for receiving a fourth message from the first base station that is transmitted according to the at least one D2D configuration parameter.

An apparatus for wireless communication is also described, comprising a processor, memory in electronic communication with the processor, and instructions stored in the memory, the instructions being executable by the processor to transmit a first message from a device to a first base station indicating that the device desires to initiate a D2D communication session, receive a second message from the first base station comprising at least one D2D configuration parameter, transmit a third message to the first base station, the third message indicating that there is data to transmit for the D2D communication session, and receive a fourth message from the first base station that is transmitted according to the at least one D2D configuration parameter.

A computer program product for wireless communication is also described, the computer program product comprising a non-transitory computer-readable medium storing instructions executable by a processor to transmit a first message from a device to a first base station indicating that the device desires to initiate a D2D communication session, receive a second message from the first base station comprising at least one D2D configuration parameter, transmit a third message to the first base station, the third message indicating that there is data to transmit for the D2D communication session, and receive a fourth message from the first base station that is transmitted according to the at least one D2D configuration parameter.

Some examples of the method, apparatuses, and/or computer program product described above may further comprise transmitting a fifth message to the first base station indicating that the device desires to terminate the D2D communication session. Some examples may further comprise sending at least one group ID code to the first base station that identifies a set of one or more devices engaging in the D2D communication session.

In some examples of the method, apparatuses, and/or computer program product described above, the third message further comprises the at least one group ID code. Some examples may further comprise mapping a set of group ID codes to a set of indices, wherein each group ID code is mapped to a different index.

In some examples of the method, apparatuses, and/or computer program product described above, the fourth message comprises an index from the set of indices. Some examples may further comprise the indication that there is data to transmit is a BSR.

In some examples of the method, apparatuses, and/or computer program product described above, the at least one D2D configuration parameter comprises a group index associated with the group ID code for the communication session. The D2D communication session may be identified in the third message according to the group index In some examples of the method, apparatuses, and/or computer program product described above the at least one D2D configuration parameter comprises a D2D radio network temporary identity (RNTI). In some examples receiving the fourth message comprises descrambling the fourth message using the D2D RNTI.

In some examples of the method, apparatuses, and/or computer program product described above the at least one D2D configuration parameter comprises a D2D semi-persistent scheduling (SPS) RNTI. Some examples may further comprise receiving a D2D SPS activation message, and transmitting a D2D SPS activation acknowledgement.

In some examples of the method, apparatuses, and/or computer program product described above, the at least one D2D configuration parameter comprises a D2D radio resource control (RRC) configuration parameter. Some examples may further comprise performing a handover from the first base station to a second base station, and continuing the D2D communication session while in a connected mode with the second base station, wherein a configuration context for the D2D communication session has been transmitted from the first base station to the second base station.

In some examples of the method, apparatuses, and/or computer program product described above, the fourth message comprises a resource grant for a D2D SA or a D2D data transmission. In some examples, the transmitting the first message is in response to a selection of a D2D communication mode at the device. In some examples, the first message comprises a group ID code. In some examples, each group ID code is mapped to a different index.

In some examples of the method, apparatuses, and/or computer program product described above, the device may receive a paging message from the first base station or an MME comprising a group ID and/or an RNTI, wherein the paging message is an indication that the device may start receiving resource grants for D2D SAs and data transmissions. In some examples, the second message is received after the first base station has received authorization from an MME for the device to engage in D2D communications.

A method of wireless communication is described, comprising receiving a first message from a first device at a base station, the first message indicating that the first device desires to initiate a D2D communication session, transmitting a second message from the base station to the first device, the second message comprising at least one D2D configuration parameter associated with the D2D communication session, receiving a third message from the first device at the base station indicating that there is data to transmit for the D2D communication session, and transmitting a fourth message from the base station to the first device according to the at least one D2D configuration parameter.

An apparatus for wireless communication is described, comprising means for receiving a first message from a first device at a base station, the first message indicating that the first device desires to initiate a D2D communication session, means for transmitting a second message from the base station to the first device, the second message comprising at least one D2D configuration parameter associated with the D2D communication session, means for receiving a third message from the first device at the base station indicating that there is data to transmit for the D2D communication session, and means for transmitting a fourth message from the base station to the first device according to the at least one D2D configuration parameter.

An apparatus for wireless communication is described, comprising a processor; memory in electronic communication with the processor, and instructions stored in the memory, the instructions being executable by the processor to receive a first message from a first device at a base station, the first message indicating that the first device desires to initiate a D2D communication session, transmit a second message from the base station to the first device, the second message comprising at least one D2D configuration parameter associated with the D2D communication session, receive a third message from the first device at the base station indicating that there is data to transmit for the D2D communication session, and transmit a fourth message from the base station to the first device according to the at least one D2D configuration parameter.

A computer program product for wireless communication is described, the computer program product comprising a non-transitory computer-readable medium storing instructions executable by a processor to receive a first message from a first device at a base station, the first message indicating that the first device desires to initiate a D2D communication session, transmit a second message from the base station to the first device, the second message comprising at least one D2D configuration parameter associated with the D2D communication session, receive a third message from the first device at the base station indicating that there is data to transmit for the D2D communication session, and transmit a fourth message from the base station to the first device according to the at least one D2D configuration parameter In some examples of the method, apparatuses, and/or computer program product described above the first message comprises at least one ID code that identifies a set of one or more devices engaging in the D2D communication session.

Some examples of the method, apparatuses, and/or computer program product described above may further comprise identifying a group index associated with the group ID code for the communication session.

In some examples of the method, apparatuses, and/or computer program product described above, identifying the group index comprises assigning the group index to the group ID code for the D2D communication session. Assigning the group index to the group ID code for the D2D communication session may include arranging the group index within a set of group indexes for active D2D communication sessions according to a priority level associated with the group ID code.

In some examples of the method, apparatuses, and/or computer program product described above, identifying the group index comprises receiving the group index in the first message.

Some examples of the method, apparatuses, and/or computer program product described above may further comprise broadcasting, from the base station, the group index associated with the group ID code in a system information message.

Some examples of the method, apparatuses, and/or computer program product described above may further comprise sending a D2D session request message to a subscription server for authorization for the D2D communication session, and receiving D2D service information for the D2D communication session from the subscription server, the D2D service information based at least in part on a subscription profile of the first device. The D2D service information may include any of a group index associated with the group ID code for the D2D communication session, group priority information associated with the group ID code, user priority information for devices associated with the group ID code, or combinations thereof. The group priority information may include an allocation retention priority (ARP) associated with the group ID code.

Some examples of the method, apparatuses, and/or computer program product described above may further comprise determining a resource allocation for the D2D communication session based at least in part on the group priority information. For example, the fourth message may include a first resource grant for first D2D data transmissions of the D2D communication session, and the first resource grant may be based at least in part on the determined resource allocation for the D2D communication session.

Some examples of the method, apparatuses, and/or computer program product described above may further comprise receiving, at the base station, an indication from a second device associated with the group ID code that the second device has data to transmit for the D2D communication session, and transmitting, from the base station, a second resource grant to the second device for second D2D data transmissions of the D2D communication session. The first and second resource grants are based at least in part on the respective user priority information associated with the first and second devices.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
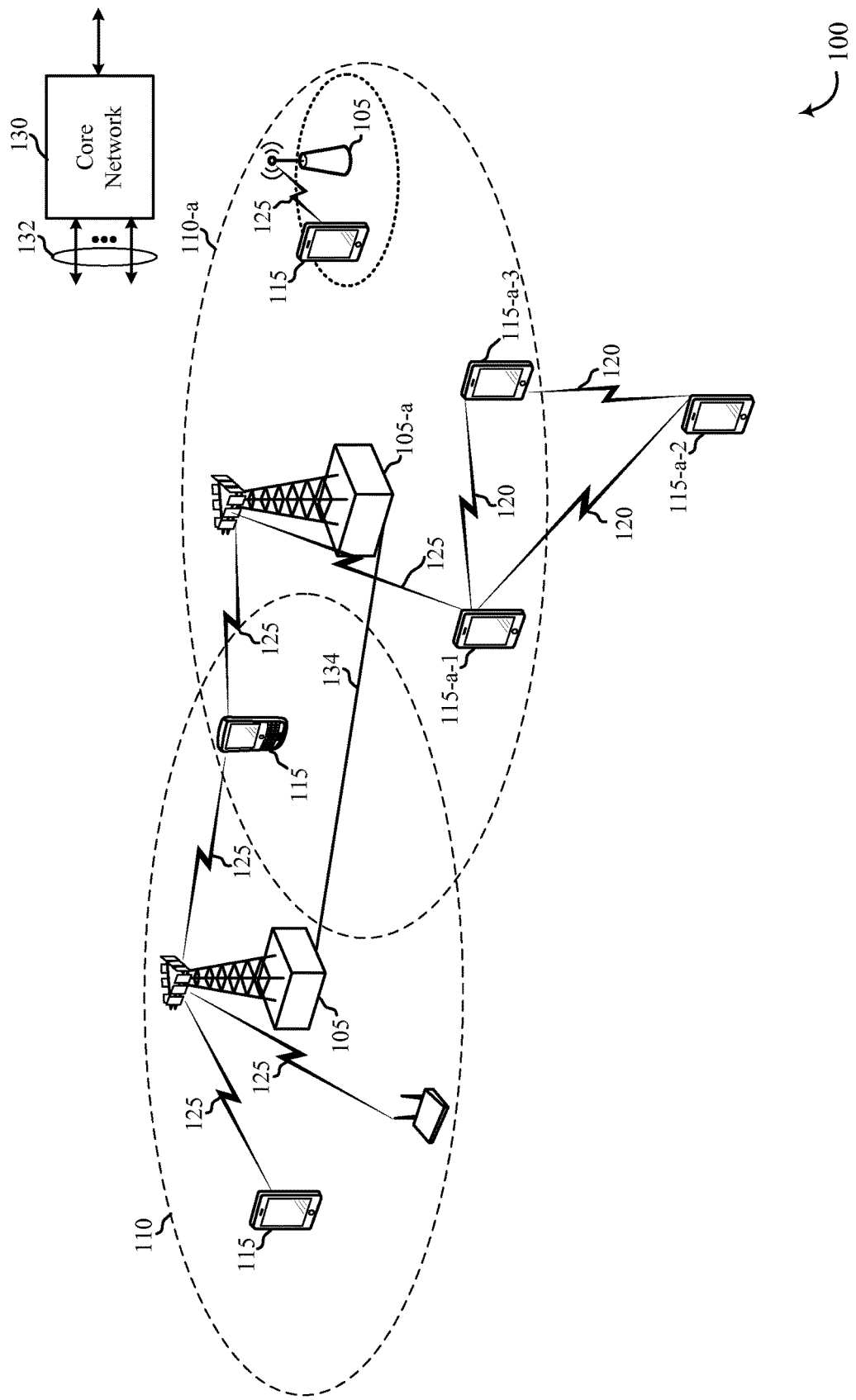
FIG. 1 shows an example of a device-to-device (D2D) wireless communications system, in accordance with various aspects of the present disclosure.

Features generally relating to one or more improved systems, methods, and/or apparatuses for device-to-device (D2D) wireless communications are described. A device (e.g., a user equipment (UE)) may transmit an initiation message to a base station indicating that the UE desires to initiate a D2D communication session for a group associated with a group identification (ID) code. The UE may then receive a response from the base station that includes parameters for configuration of the D2D session, which may include a group index for the D2D communication session and/or a D2D temporary identity sequence, in some examples. When it has data to send to another UE, the UE may transmit a buffer status report (BSR) to the base station, which may use the group index to identify the D2D communication session. The base station may respond with a grant for a D2D scheduling assignment (SA) configured according to the previously sent parameters. For example, the message may be scrambled with the D2D temporary identity sequence.

The described features include identifying group indexes for active D2D communication sessions. The group index may be assigned by the base station, received from a network entity, or selected and transmitted by the UE initiating the D2D communication session. A base station may receive priority information for D2D communication sessions, which may include group priority information and/or UE priority information within the group.

These features may generally provide a means by which a device or group of devices may coordinate a D2D communications session with a serving base station. This may enable devices to engage in D2D communications, mitigate interference between D2D transmissions and network transmissions, and ensure that public safety operations proceed with uninterrupted communications capability.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

FIG. 1 shows an example of a D2D wireless communications system 100, in accordance with various aspects of the present disclosure. The D2D wireless communications system 100 includes base stations 105, communication devices, also known as UE 115, and a core network 130. The base stations 105 may communicate with the UEs 115 under the control of a base station controller (not shown), which may be part of the core network 130 or the base stations 105 in various examples. Base stations 105 may communicate control information and/or user data with the core network 130 through backhaul links 132. In examples, the base stations 105 may communicate, either directly or indirectly, with each other over backhaul links 134, which may be wired or wireless communication links. The D2D wireless communications system 100 may support operation on multiple carriers (waveform signals of different frequencies). Wireless communication links 125 may be modulated according to various radio technologies. Each modulated signal may carry control information (e.g., reference signals, control channels, etc.), overhead information, data, etc. Wireless communication links 120 may also be established between UEs 115-$a$ in a configuration known as D2D communication.

The base stations 105 may wirelessly communicate with the UEs 115 via one or more base station antennas. Each of the base station 105 sites may provide communication coverage for a respective geographic area 110. In some examples, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area. The D2D wireless communications system 100 may include base stations 105 of different types (e.g., macro, micro, and/or pico base stations). There may be overlapping coverage areas for different technologies.

The D2D wireless communications system 100 may be a Heterogeneous LTE/LTE-A network in which different types of base stations provide coverage for various geographical regions. For example, each base station 105 may provide communication coverage for a macro cell, a pico cell, a femto cell, and/or other types of cell. A macro cell generally covers a relatively large geographic area (e.g., several kilometers in radius) and may allow unrestricted access by devices with service subscriptions with the network provider. A pico cell would generally cover a relatively smaller geographic area and may allow unrestricted access by devices with service subscriptions with the network provider. A femto cell would also generally cover a relatively small geographic area (e.g., a home) and, in addition to unrestricted access, may also provide restricted access by devices having an association with the femto cell.

The core network 130 may communicate with the base stations 105 via a backhaul 132 (e.g., S1, etc.). The base stations 105 may also communicate with one another, e.g., directly or indirectly via backhaul links 134 (e.g., X2, etc.) and/or via backhaul links 132 (e.g., through core network 130). The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid Automatic Repeat Request (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each device may be stationary or mobile. A UE 115 may communicate with other UEs 115 using D2D communications. One or more of a group of devices utilizing D2D communications (for example, a first UE 115-a-1) may be within a coverage area 110-a of a cell (e.g., base station 105-a). Other UEs (for example, a second UE 115-a-2) in the group may be outside the coverage area 110-a of the cell, or otherwise unable to receive transmissions from a base station 105-a. Groups of UEs 115-a communicating via D2D communications may utilize a one-to-many (1:M) system in which each UE 115-a transmits to every other UE 115-a in the group. In some cases, a base station 105-a facilitates the scheduling of resources for D2D communications. In other cases, D2D communications are carried out independent of a base station 105. In some cases, UEs 115-a engaged in D2D communications may be located relatively closely. In other circumstances, the UEs 115-a may communicate with each other over long distances. In some cases, the UEs 115-a may be associated with a group ID code that may be used to identify and authenticate the UEs 115-a as part of a group. The group ID code may, for example, uniquely identify the group globally or within a provider network. In some cases, the group ID code is a 48-bit ID code, but group ID codes having greater or fewer numbers of bits may be used, in some examples.

A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A device may be able to communicate with macro eNBs, pico eNBs, femto eNBs, relays, and the like.

The wireless communication links 125 shown in system 100 may include uplink (UL) transmissions from a UE 115 to a base station 105, and/or downlink (DL) transmissions, from a base station 105 to a UE 115 over DL carriers. The downlink transmissions may also be called forward link transmissions while the uplink transmissions may also be called reverse link transmissions. The D2D wireless communications system 100 may also support D2D communication links 120, which may be communicated over the same carriers (e.g., DL, UL, etc.) as used by the wireless communication links 125 between base stations 105 and UEs 115.

Figure 2:
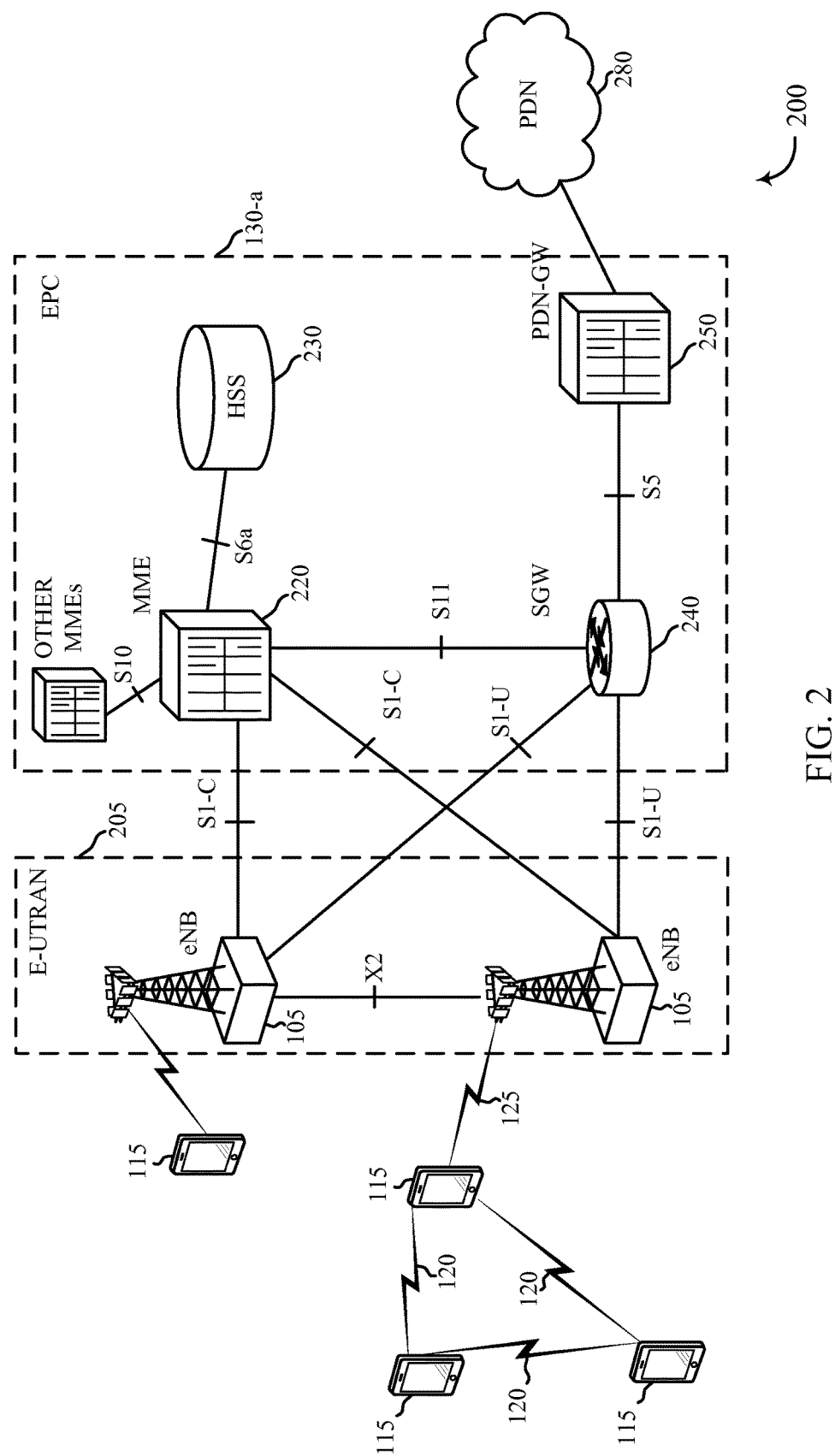
FIG. 2 shows a diagram illustrating a long term evolution (LTE)/LTE-Advanced network architecture, in accordance with various aspects of the present disclosure.

FIG. 2 shows a diagram 200 illustrating an LTE/LTE-Advanced network architecture, in accordance with various aspects of the present disclosure. The LTE/LTE-A network architecture may include a core network (referred to as an Evolved Packet System (EPS)). The EPS may include an Evolved UMTS Terrestrial Radio Access Network (E-UTRAN) 205 and an Evolved Packet Core (EPC) 130-a, supporting providing network access services to one or more UEs 115. The EPS may connect to various packet data networks (PDNs) 280, which may include the Internet, the Intranet, an IP Multimedia Subsystem (IMS), and a Packet-Switched (PS) Streaming Service (PSS). The EPS may interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN 205 may include eNBs 105, which may provide user and control plane protocol terminations toward the UEs 115. The eNBs 105 may be connected to each other (e.g., via an X2 interface, etc.). The eNBs 105 may provide an access point to the EPC 130-a for the UEs 115. The eNBs 105 may be connected by one or more interfaces (e.g., S1-C, S1-U, etc.) to the EPC 130-a. The EPC 130-a may include Mobility Management Entities (MMEs) 220, Serving Gateway (SGW) 240, Home Subscriber Server (HSS) 230, and a Packet Data Network Gateway (PDN-GW) 250. The MME 220 may be the control node that processes the signaling between the UEs 115 and the EPC 130-a. Generally, the MME 220 may provide bearer and connection management. The HSS 230 may store subscription information for UEs 115 associated with the network. The HSS 230 may perform authentication and authorization for services provided to UEs 115 via the network. All user IP packets may be transferred through the SGW 240, which itself may be connected to the PDN-GW 250. The PDN-GW 250 may provide UE IP address allocation as well as other functions. The PDN-GW 250 may be connected to one or more PDNs 280.

Figure 3:
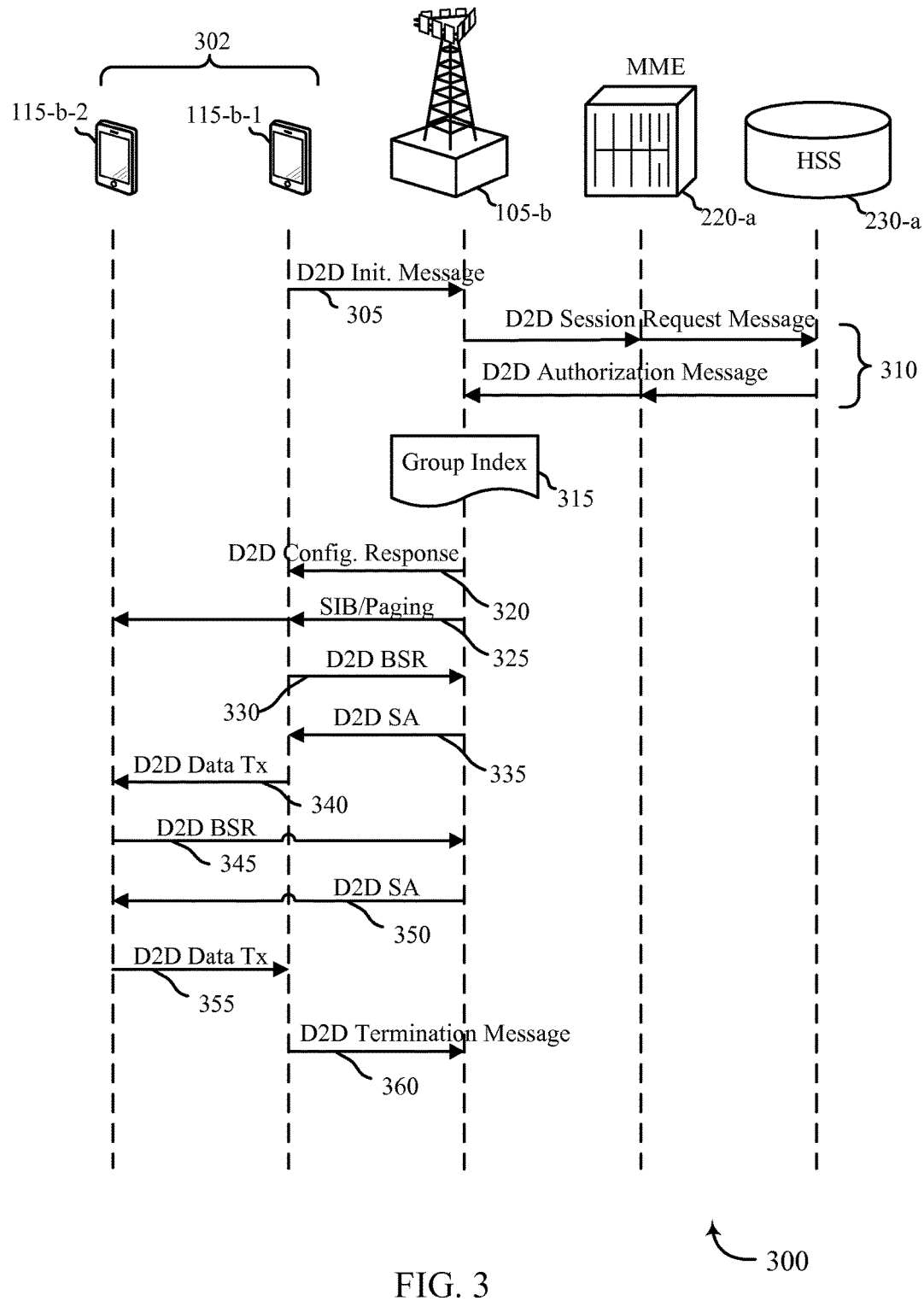
FIG. 3 illustrates an example of a signaling flow for wireless D2D communication, in accordance with various aspects of the present disclosure.

FIG. 3 illustrates a diagram of a signaling flow 300 for wireless D2D communication, in accordance with various aspects of the present disclosure. In signaling flow 300, UEs 115-b-1 and 115-b-2 may be part of a group 302 for D2D communications, which may be identified by a group ID code in a network (e.g., LTE/LTE-A network) including a base station 105-b, MME 220-a, and HSS 230-a. UEs 115-b-1 and 115-b-2 may be examples of the UEs 115 of FIG. 1 or FIG. 2, and the base station 105-b may be an example of the base stations 105 of FIG. 1 or FIG. 2.

The UE 115-b-1 may transmit a first message 305 (e.g., a D2D Initiation Message as illustrated) to the base station 105-b indicating that the UE 115-b-1 desires to initiate a D2D communication session for the group 302. In one example, the first message 305 may be a RRC message indicating a request to initiate a D2D communication session. In some examples, transmission of the first message 305 may be in response to selection of a D2D communication mode at the UE 115-b.

In some cases the first message 305 may include a group ID code for the group of devices 302 that will be engaged in D2D communications for the D2D communication session. In some cases, more than one group ID code will be sent. The group ID codes may be used to identify which D2D group are the subject of future D2D messages for the D2D communication session. For example, a public safety team may associate each device being used by a member of the team with a predefined group ID.

The base station 105-b may exchange messaging 310 to authenticate and authorize the D2D communication session. For example, the base station 105-b may send a D2D session request message to the MME 220-*a* and/or HSS 230-*a*. The D2D session request message may include, for example, an ID (e.g., international mobile subscriber identity (IMSI), etc.) of the UE and/or the group ID code. The MME 220-*a* may exchange messaging with the HSS, which may determine if the UE 115-*b*-1 is authorized to initiate the D2D communication session for the group 302. The base station 105-*b* may receive D2D service information for the D2D communication session (e.g., in a D2D Authorization Message) from the MME 220-*a* and/or HSS 230-*a* indicating that the D2D communication session is authenticated and authorized. The D2D service information may be determined by the MME 220-*a* and/or HSS 230-*a* based at least in part on a subscription profile of the UE 115-*b*-1.

Figure 4:
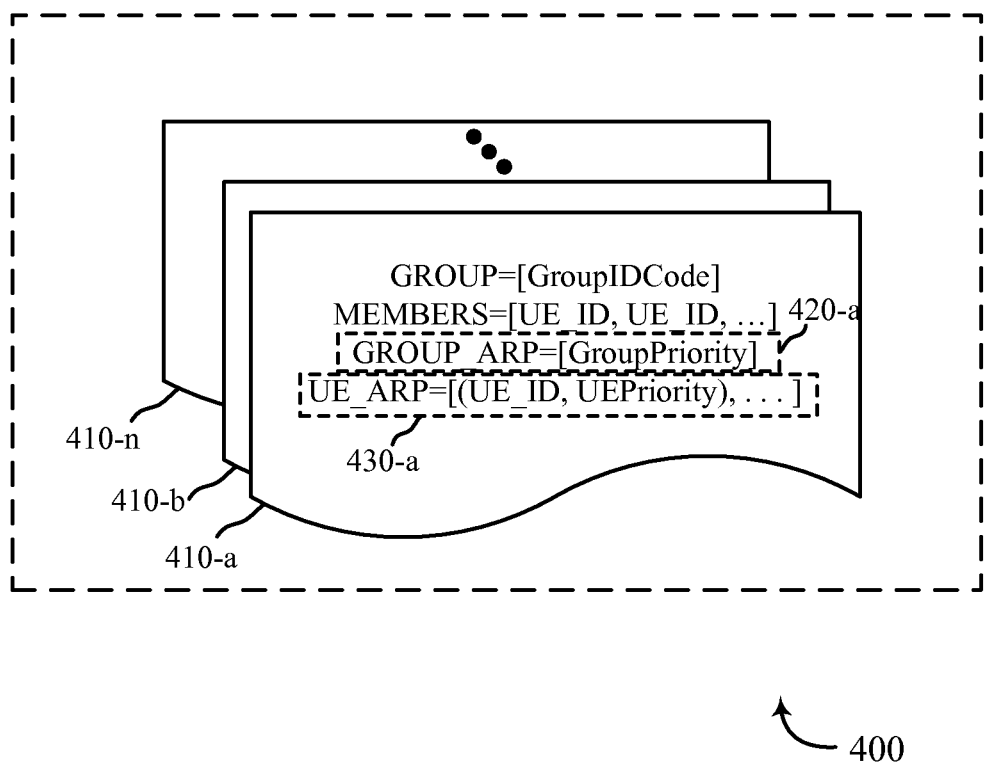
FIG. 4 illustrates group priority information that may be maintained for wireless D2D communication, in accordance with various aspects of the present disclosure.

In some examples, the group 302 may be associated with priority information (e.g., allocation retention priority (ARP), etc.). For example, the HSS 230-*a* may maintain a data store of priority information related to each group ID and/or UE 115. FIG. 4 illustrates D2D priority information 400 that may be maintained at the HSS 230-*a* in accordance with various aspects of the present disclosure. As illustrated in FIG. 4, the HSS 230-*a* may store information associated with each group and each UE 115 subscriber. For a group 410-*a*, the HSS 230-*a* may store group priority information 420-*a* and/or UE priority information 430-*a*. The group priority information 420-*a* may relate to priority of the group ID code in relation to other group ID codes. The UE priority information 430-*a* may relate to priority of UEs within the group. For example, for emergency responders, the captain or other management and control entity may have a higher priority within a D2D group. The HSS 230-*a* may store additional group priority information and UE priority information for additional groups 410-*b*, 410-*n*, etc. The D2D service information may include group priority information associated with the group ID code, UE priority information for UEs within the group, the group ID code, and/or a group index for the D2D communication session.

Returning to FIG. 3, the base station 105-*b* may identify a group index 315 for the D2D communication session at block 315. The group index 315 may be an index having fewer bits than group ID codes used for identifying groups globally or within a provider network. For example, the group index may be 4, 8, 12, or 16 bits while the group ID codes may generally be 48 bits or longer. Thus, the group index may be used in messaging such as layer-2 signaling (e.g., MAC control elements, etc.) where the group ID code length may result in loss of efficiency in carrying other control elements or packet data.

In some examples, the base station 105-*b* may assign the group index 315 for the D2D communication session. For example, the base station 105-*b* may maintain a set of group indexes and may assign the group ID code to a currently unused group index 315 for the D2D communication session upon receiving the first message 305. The base station 105-*b* may arrange the group index 315 assigned to the group ID code within the set of group indexes based on the group priority information.

In other examples, the base station 105-*b* may identify the group index 315 based on the network messaging 310 for authentication and authorization of the D2D communication session. For example, group index may be statically or semi-statically assigned to the group ID code in the HSS and the HSS 230-*a* may provide the group index 315 in the D2D authorization message to the base station 105-*b*.

In yet other examples, the UE 115-*b*-1 that initiates the D2D communication session may select a group index for the communication session and may send the group index to the base station 105-*b* in the first message. For example, the UE 115-*b*-1 may determine the group index based on a pseudo-random function of the group ID code and/or other parameters such as system frame number (SFN), UE ID (e.g., IMSI, etc.), and the like.

The base station 105-*b* may send a second message 320 (e.g., a D2D Configuration Response) to the UE 115-*b*-1 including at least one D2D configuration parameter for the D2D communication session. The at least one D2D configuration parameter may include the assigned group index 315, a D2D radio network temporary identity (RNTI) for the D2D communication session, and the like. In some examples, the D2D configuration parameter includes a D2D semi-persistent scheduling (SPS) RNTI. The second message 320 may also include other RRC configuration parameters.

In some cases, the base station 105-*b* may transmit information related to the D2D communication session to other devices in the group. For example, the base station 105-*b* may broadcast system information messaging (e.g., a system information block (SIB), etc.) 325 that includes the group index 315 assigned to the D2D communication session. Additionally or alternatively, the base station 105-*b* may send paging messages 325 to other UEs 115 in the group such as UE 115-*b*-2. The paging messages 325 may contain the group index and/or RNTI indicating that devices from that group may receive resources for D2D scheduling and transmission. In some examples, other base stations 105 may also transmit information related to the D2D communication session to other devices in the group. For example, group indexes may be assigned for a tracking area, and other base stations 105 within the tracking area may broadcast information related to the D2D communication session.

The UE 115-*b*-1 may then transmit a third message 330 (e.g., a D2D BSR) to the base station 105-*a*. The third message 330 may indicate that the UE 115-*b*-1 has data to transmit for the D2D communication session. In some cases, the group ID code may be used to identify the group for which the UE 115-*b*-1 is requesting resources. Additionally or alternatively, the UE 115-*b*-1 may use the group index 315 associated with the group ID code to identify the group in the third message 330. For example, a D2D BSR may be transmitted in the third message as a MAC control element in the third message 330. The D2D BSR may include one or more bytes that include the group index 315, a buffer size value, and/or a logical channel group ID field (LCG ID) which identifies a group of logical channel(s) for which buffer status is being reported. In some examples, the group index 315 may be eight bits, the LCG ID may be two bits, and the buffer size value may be six bits. In other examples, the group index 315 and/or buffer size value may be more or fewer bits, and the LCG ID field may be omitted. Thus, a MAC control element for the D2D BSR may be one or more bytes, and may be identified by a predetermined value in a logical channel ID (LCID) field in a MAC header.

The base station 105-*b* may transmit a fourth message 335 (e.g., a grant for a D2D SA) to the UE 115-*b*-1 to assign resources for the D2D communication session. The fourth message 335 may be transmitted according to the at least one D2D configuration parameter. For example, the fourth message 335 may be scrambled with the D2D RNTI. Thus, receiving the fourth message 335 at the UE 115-*b*-1 may include decoding the fourth message 335 using the D2D RNTI. The fourth message 335 may include a D2D SA, or a grant of resources where the D2D SA is transmitted (e.g., using MAC control signaling or RRC signaling, etc.). The D2D SA may be a D2D SPS activation message. In this case, the UE 115-*b*-1 may respond by sending a D2D SPS activation acknowledgement.

In some cases, the amount of resources assigned for the communication session may be determined by the base station 105-*b* based on the priority information of the group 302. For example, where multiple groups request resources, the priority information received from the HSS 230-*a* may be used for determining relative allocations of resources.

The UE 115-*b*-1 may then send D2D data transmissions 340 over the assigned resources for the D2D communication session. The D2D data transmissions 340 may be received by other UEs 115 in the group such as UE 115-*b*-2.

In some cases, other UEs 115 of the group 302 such as UE 115-*b*-2 may have D2D data to send to the group. UE 115-*b*-2 may send a message 345 including a D2D BSR to the base station 105-*b*. The base station 105-*b* may send a message 350 including a D2D SA to the UE 115-*b*-2 allocating resources for the UE 115-*b*-2 for the D2D communication session. In some cases, the allocations of resources to UE 115-*b*-1 and UE 115-*b*-2 for the D2D communication session may depend on UE priority information received from the HSS 230-*a*. For example, the base station 105-*b* may determine resource allocations for communications for UEs 115-*b*-1 and 115-*b*-2 based on the group priority and relative priorities of the UEs within the group 302. The UE 115-*b*-2 may then transmit D2D data transmissions 355 over the assigned resources for the D2D communication session. The D2D data transmissions 355 may be received by other UEs 115 in the group such as UE 115-*b*-1.

In some cases, the UE 115-*b*-1 may transmit a fifth message 360 (e.g., a D2D Termination Message) to the base station 105-*b* indicating that the UE desires to terminate the D2D communication session. In other cases, the UE 115-*b*-1 may perform a handover from the base station 105-*b* to a second base station 105 (not shown). The UE 115-*b*-1 may continue the D2D communication session while in a connected mode with the second base station 105. The base station 105-*b* may send RRC context information for the D2D communication session to the second base station 105 to ensure that the D2D session may continue without interruption or interference.

Figure 5:
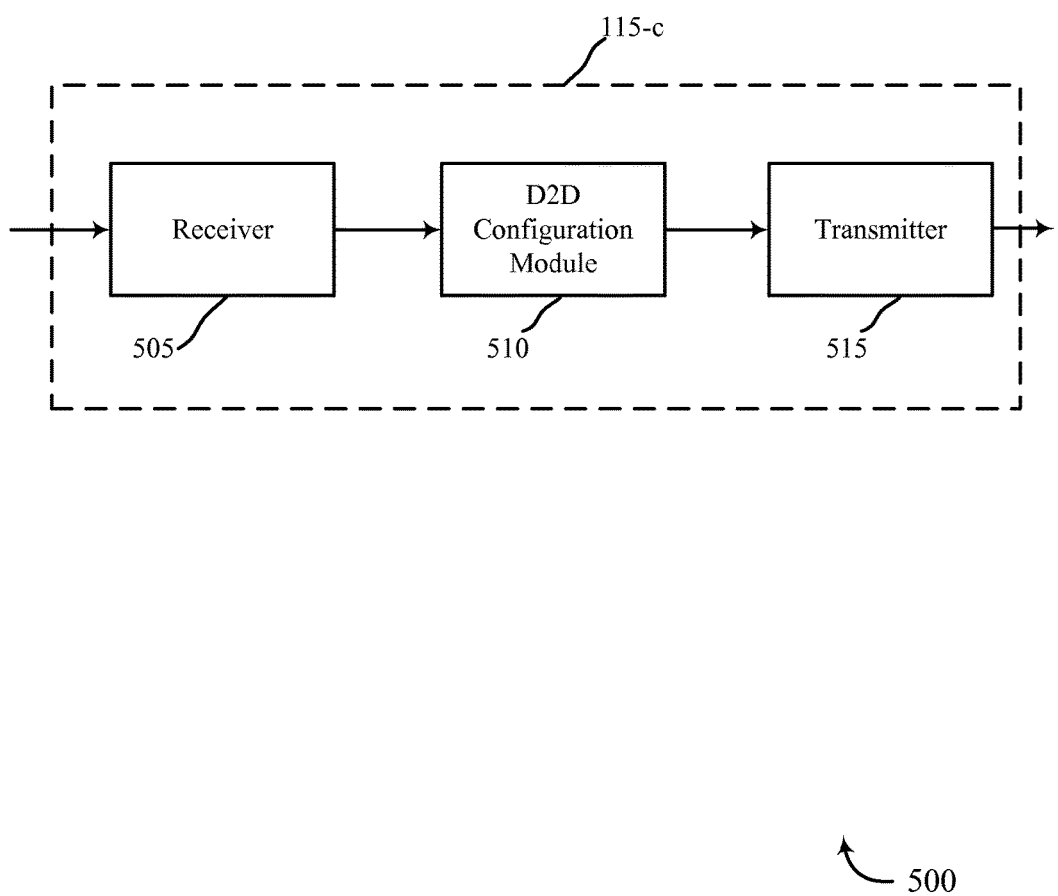
FIG. 5 shows a block diagram of a device for wireless D2D communication, in accordance with various aspects of the present disclosure.

FIG. 5 shows a block diagram 500 of a UE 115-*c* for wireless D2D communication, in accordance with various aspects of the present disclosure. The UE 115-*c* may be an example of one or more aspects of a UE 115 described with reference to FIGS. 1-2. The UE 115-*c* may include a receiver 505, a D2D configuration module 510, and/or a transmitter 515. The UE 115 may also include a processor. Each of these components may be in communication with each other.

The components of the UE 115-*c* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver 505 may receive information such as packets, user data, and/or control information associated with various information channels (e.g., control channels, data channels, etc.). Information may be passed on to the D2D configuration module 510, and to other components of the UE 115-*c*.

The D2D configuration module 510 may be configured to transmit a first message from a device to a first base station indicating that the device desires to initiate a D2D communication session. The D2D configuration module 510 may also be configured to receive a second message from the first base station comprising at least one D2D configuration parameter. The D2D configuration module 510 may also be configured to transmit a third message to the first base station, the third message indicating that there is data to transmit for the D2D communication session. The D2D configuration module 510 may also be configured to receive a fourth message from the first base station that is transmitted according to the at least one D2D configuration parameter. The D2D configuration module may be configured to transmit and receive D2D configuration messages in coordination with the receiver 505 and the transmitter 515.

The transmitter 515 may transmit the one or more signals received from other components of the UE 115-*c*. In some examples, the transmitter 515 may be collocated with the receiver 505 in a transceiver module. The transmitter 515 may include a single antenna, or it may include a plurality of antennas.

Figure 6:
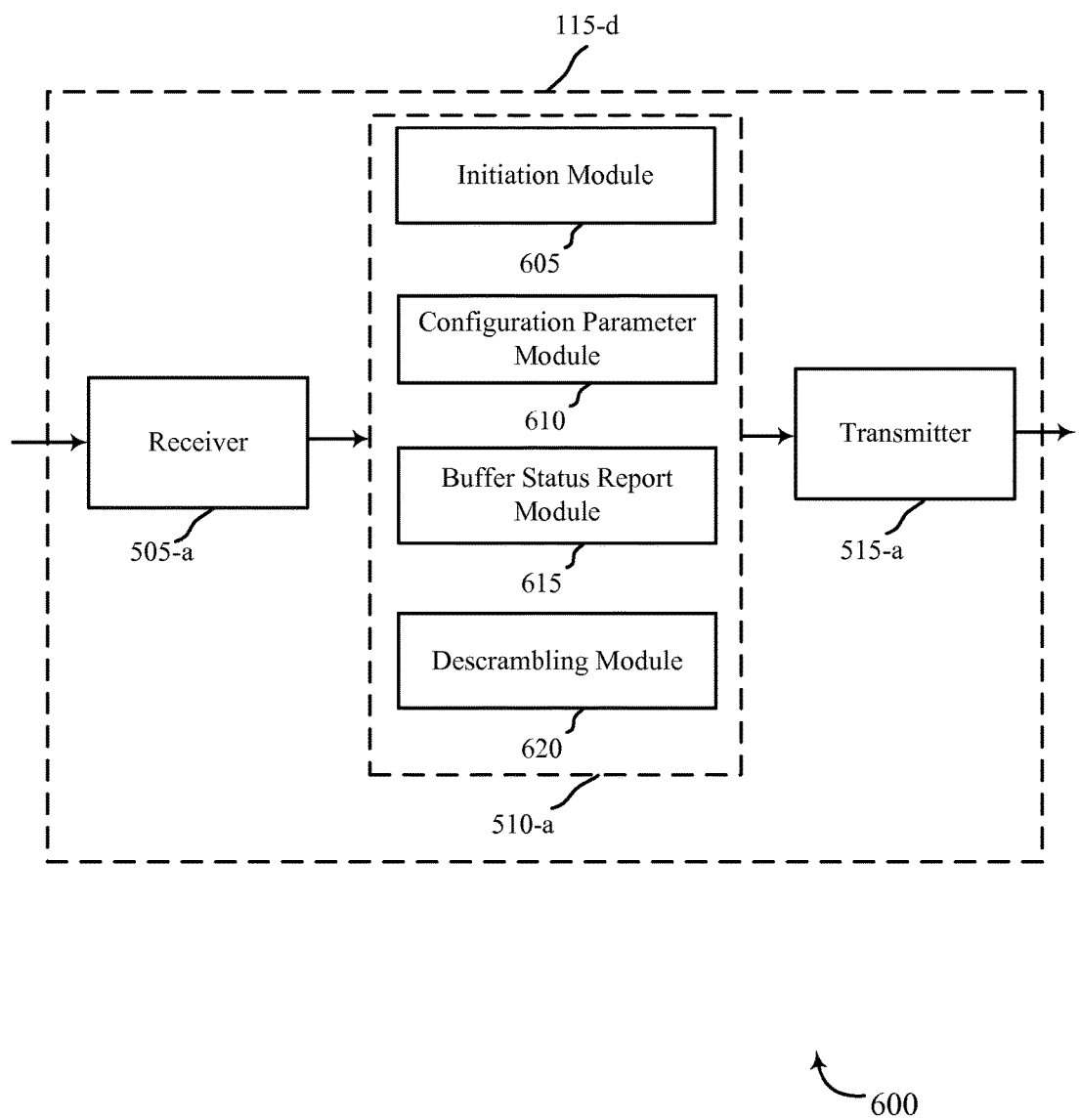
FIG. 6 shows a block diagram of a device for wireless D2D communication, in accordance with various aspects of the present disclosure.

FIG. 6 shows a block diagram 600 of a UE 115-*d* for wireless communication, in accordance with various aspects of the present disclosure. The UE 115-*d* may be an example of one or more aspects of UEs 115 described with reference to FIGS. 1-3. The UE 115-*d* may include a receiver 505-*a*, a D2D configuration module 510-*a*, and/or a transmitter 515-*a*. The UE 115-*d* may also include a processor. Each of these components may be in communication with each other. The D2D configuration module 510-*a* may also include an initiation module 605, a configuration parameter module 610, and a BSR module 615.

The components of the UE 115-*d* may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The receiver 505-*a* may receive information which may be passed on to the D2D configuration module 510-*a*, and to other components of the UE 115-*d*. The D2D configuration module 510-*a* may be configured to perform the operations described above with reference to FIG. 3. The transmitter 515-*a* may transmit the one or more signals received from other components of the UE 115-*d*.

The initiation module 605 may be configured to transmit a first message from a device to a first base station indicating that the device desires to initiate a D2D communication session. In some examples, the first message comprises a group ID code. In one example, the first message may be a radio resource control (RRC) message. In some examples, transmission of the first message may be in response to selection of a D2D communication mode at the UE 115-*d*.

The configuration parameter module 610 may be configured to receive a second message from the first base station comprising at least one D2D configuration parameter. In some examples, the at least one D2D configuration parameter comprises a D2D RNTI. In some examples, the at least one D2D configuration parameter comprises a D2D SPS RNTI. In other examples, the at least one D2D configuration parameter comprises a D2D RRC configuration parameter. The configuration parameter module 610 may also be configured to receive a paging message from the first base station or an MME comprising a group ID and/or an RNTI, wherein the paging message is an indication that the UE 115-*d* may start receiving resource grants for D2D SAs and data transmissions.

The BSR module 615 may be configured to transmit a third message to the first base station, the third message indicating that there is data to transmit for the D2D communication session. In some examples, the third message further comprises the at least one group ID code. In some examples, the indication that there is data to transmit is a BSR.

The descrambling module 620 may be configured to descramble a fourth message received from the first base station. In some examples, the fourth message may be scrambled with a D2D RNTI. In such cases, the received fourth message may be descrambled using the D2D RNTI. The use of the D2D RNTI to scramble the message may indicate to the device 115 that the message contains a grant of resources for a D2D SA and/or a D2D data transmission.

Figure 7:
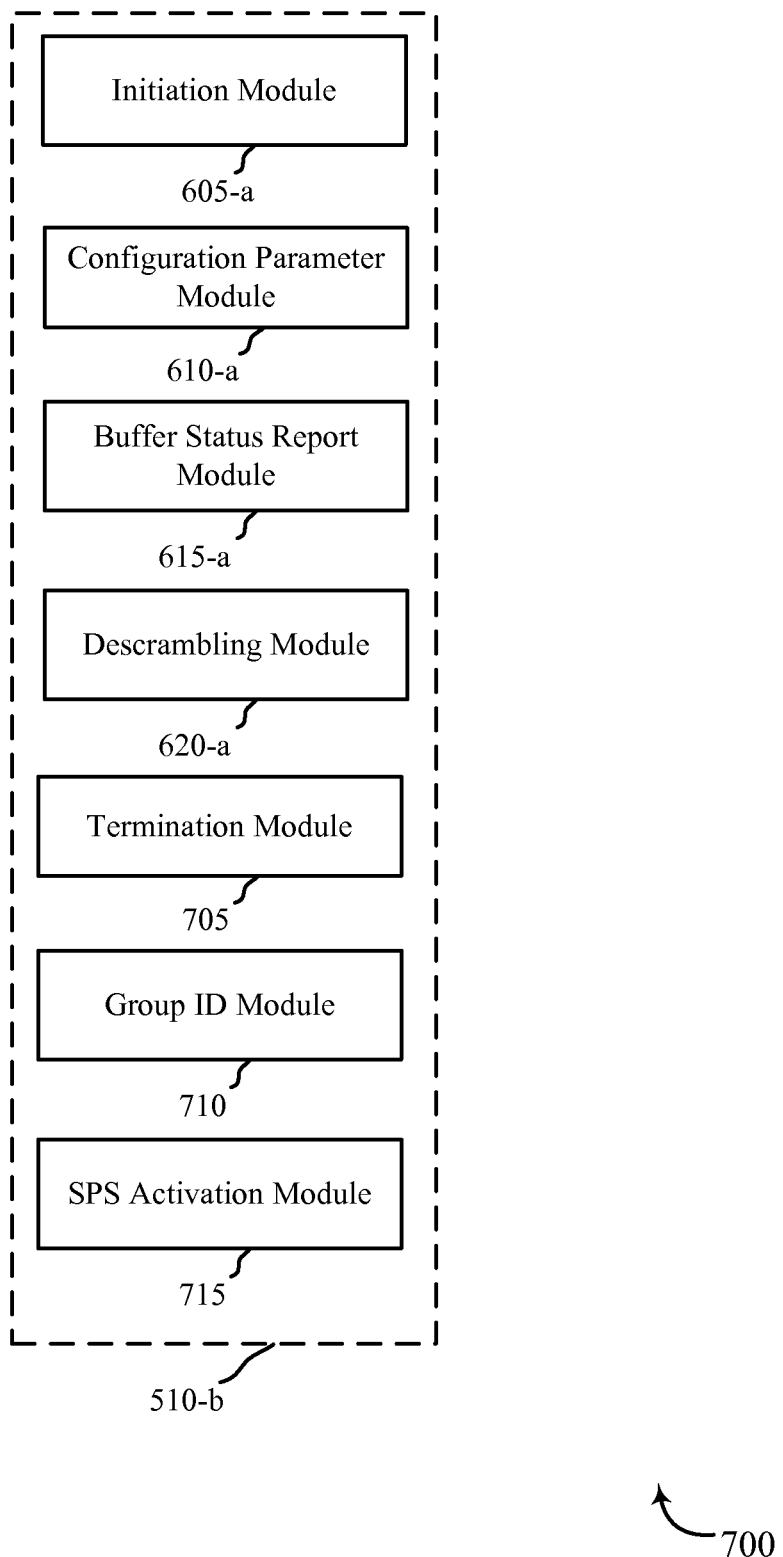
FIG. 7 shows a block diagram of a device for wireless D2D communication, in accordance with various aspects of the present disclosure.

FIG. 7 shows a block diagram 700 of a D2D configuration module 510-*b* for wireless D2D communication, in accordance with various aspects of the present disclosure. The D2D configuration module 510-*b* may be an example of one or more aspects of a D2D configuration module 510 described with reference to FIG. 5 or FIG. 6. The D2D configuration module 510-*b* may include an initiation module 605-*a*, a configuration parameter module 610-*a*, a BSR module 615-*a*, and a descrambling module 620-*a*. Each of these modules may perform the functions described above with reference to FIG. 6. The D2D configuration module 510-*b* may also include a termination module 705, a group ID module 710, and an SPS activation module 715.

The components of the D2D configuration module 510-*b* may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The termination module 705 may be configured to transmit a fifth message to the first base station indicating that the device desires to terminate the D2D communication session. In some cases, this may be in response to a user making a selection on the device 115 to end the D2D session.

The group ID module 710 may be configured to send at least one group ID code to the first base station that identifies a set of one or more devices engaging in the D2D communication session. The group ID module 710 may be configured to map a set of group ID codes to a set of indices, wherein each group ID code is mapped to a different index. In some examples, each group ID code is mapped to a different index. In some cases one or more group ID codes may be sent with the first initiation message. In other cases, the one or more group ID codes may be sent with a BSR.

The SPS activation module 715 may be configured to receive a D2D SPS activation message. A D2D SPS activation message may be an indication that a set of resources may be available for D2D transmissions for a period of time lasting a number of subframes or frames. After this period of time, the resource grant may expire or be automatically deactivated. In some cases, the UE 115 may also receive a D2D SPS deactivation message. After receiving the D2D SPS activation message, the SPS activation module 715 may be configured to transmit a D2D SPS activation acknowledgement.

Figure 8:
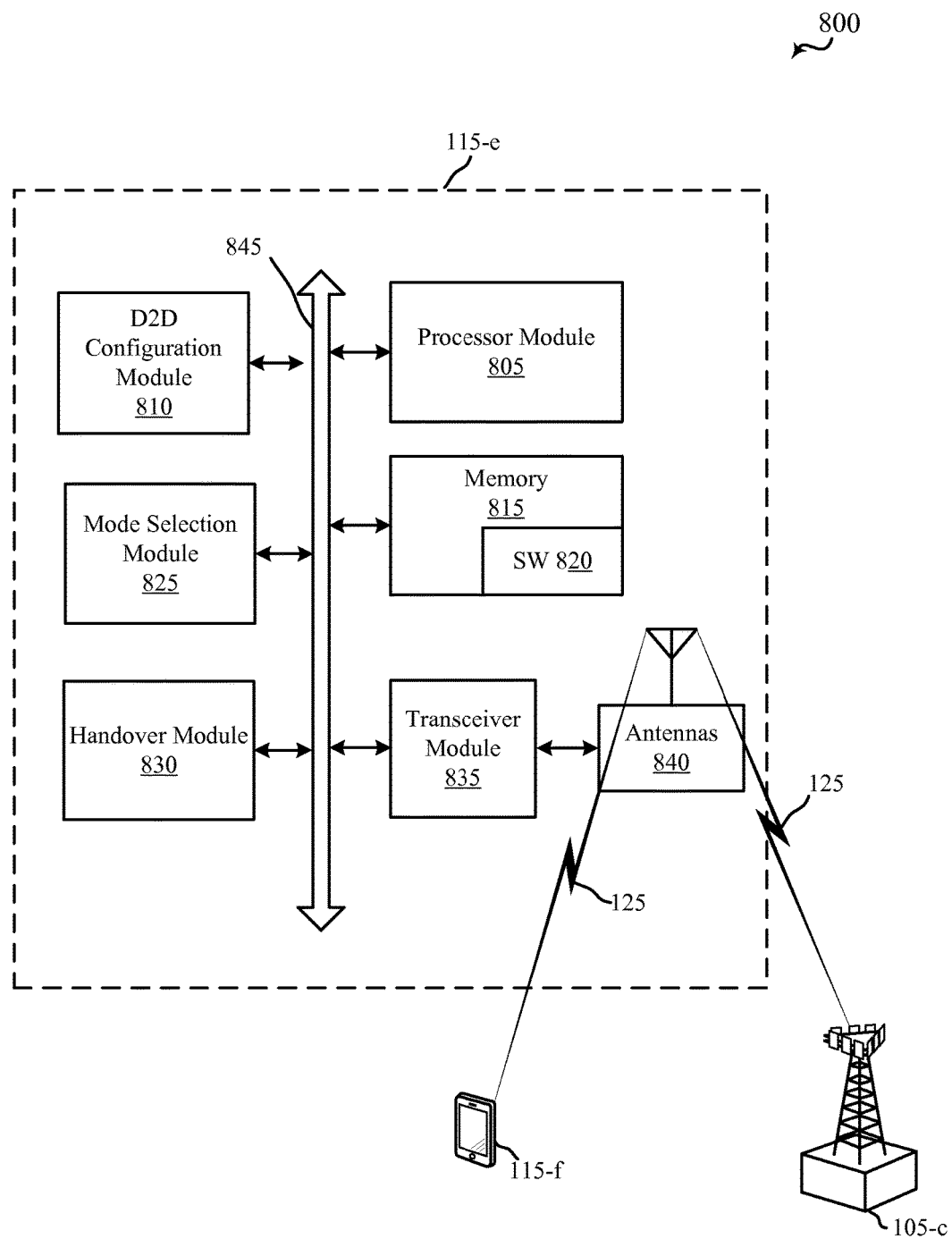
FIG. 8 illustrates a block diagram of a system for wireless D2D communication, in accordance with various aspects of the present disclosure.

FIG. 8 shows a diagram of a system 800 for wireless D2D communication, in accordance with various aspects of the present disclosure. System 800 may include a UE 115-*e*, which may be an example of a UE 115 with reference to FIGS. 1-3. The UE 115-*e* may generally include components for bi-directional voice and data communications including components for transmitting communications and components for receiving communications. The UE 115-*e* may also be engaged in wireless communication with a base station 105-*c* that may be an example of a base station 105 with reference to FIGS. 1-2 and/or a different UE 115-*f* that may be an example of a UE 115 with reference to FIGS. 1-3. UE 115-*e* may also include a D2D configuration module 810 that may be an example of a D2D configuration module 510 with reference to FIGS. 5-7.

The UE 115-*e* may include antenna(s) 840, a transceiver module 835, a processor module 805, and memory 815 (including software (SW) 820), which each may communicate, directly or indirectly, with each other (e.g., via one or more buses 845. The transceiver module 835 may be configured to communicate bi-directionally, via the antenna(s) 840 and/or one or more wired or wireless links, with one or more networks, as described above. For example, the transceiver module 835 may be configured to communicate bi-directionally with a base station 105. The transceiver module 835 may include a modem configured to modulate packets and provide the modulated packets to the antenna(s) 840 for transmission, and to demodulate packets received from the antenna(s) 840. While the UE 115-*e* may include a single antenna 840, the UE 115 may also have multiple antennas 840 capable of concurrently transmitting and/or receiving multiple wireless transmissions. The transceiver module 835 may also be capable of concurrently communicating with one or more base stations 105.

The memory 815 may include random access memory (RAM) and read-only memory (ROM). The memory 815 may store computer-readable, computer-executable software/firmware code 820 containing instructions that are configured to, when executed, cause the processor module 805 to perform various functions described herein (e.g., initiating D2D communication sessions, transmitting D2D BSRs, receiving D2D SAs, terminating D2D communication sessions, etc.). Alternatively, the software/firmware code 820 may not be directly executable by the processor module 805 but be configured to cause a computer (e.g., when compiled and executed) to perform functions described herein. The processor module 805 may include an intelligent hardware device, e.g., a central processing unit (CPU), a microcontroller, an ASIC, etc.

A mode selection module 825 may be configured to determine whether a user has selected a D2D communications mode. This may be in response to a user interaction with an application on the UE 115-*e*. The mode selection module 825 may also be configured to determine whether a user has selected to end a D2D communications session. In this case, the selection may be an indication to send a D2D session termination message to the base station 105-c.

A handover module 830 may be configured to conduct handovers from one base station 105 to another base station 105. In some cases, a handover may occur while the UE 115-e is engaged in a D2D communications session. In this case, the handover may involve the source base station communicating D2D RRC context and/or other information related to the active D2D session to the target base station.

Figure 9:
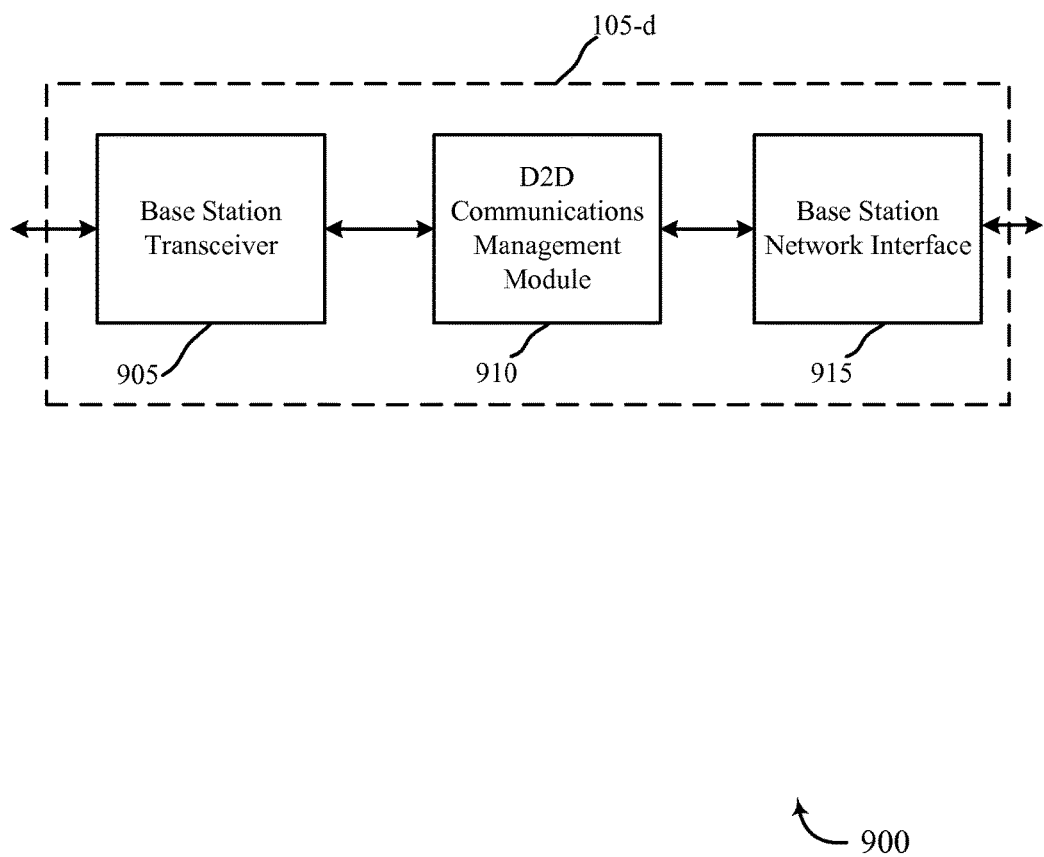
FIG. 9 shows a block diagram of a base station for supporting wireless D2D communication, in accordance with various aspects of the present disclosure.

FIG. 9 shows a block diagram 900 of a base station 105-d for supporting wireless D2D communication, in accordance with various aspects of the present disclosure. The base station 105-d may be an example of one or more aspects of base stations 105 described with reference to FIGS. 1-3. The base station 105-d may include a base station transceiver 905, a D2D communications management module 910, and/or a base station network interface 915. The base station 105-d may also include a processor (not shown). Each of these components may be in communication with each other.

The base station transceiver module 905 may be used to transmit and receive various types of data and/or control signals (i.e., transmissions) over one or more communication links of a wireless communication system, such as the wireless communications systems 100 and/or 200 described with reference to FIG. 1 and/or FIG. 2. In some examples, the base station transceiver module 905 may be operable to communicate messaging with UEs 115 related to initiating and requesting resources for D2D communication sessions such as D2D initiation messages, D2D Configuration Response Message, BSR messages, D2D SA messages, D2D session termination messages, and the like. The base station transceiver module 905 may pass information related to UE messaging for D2D communication sessions to the D2D communications management module 910.

The base station network interface 915 may be operable to send and receive network messaging related to D2D communication sessions such as messaging from an MME and/or HSS related to authentication and/or authorization messaging for D2D sessions as described above. The base station network interface 915 may pass information related to the communicated D2D network messaging (e.g., D2D authentication and authorization information, etc.) to the D2D communications management module 910.

The D2D communications management module 910 may receive information related to D2D communication sessions from the base station transceiver module 905 and base station network interface 915. The D2D communications management module 910 may perform operations for management of D2D communication sessions such as identifying group indexes for D2D communication sessions for groups (e.g., where each group is associated with a group ID code, etc.), broadcasting (e.g., via base station transceiver 905) D2D communication session information, paging UEs associated with active groups, determining resource allocations for D2D communication sessions and for transmitting UEs within D2D communication sessions based on priority information, and the like. The D2D communications management module 910 may send (e.g., via base station transceiver 905) resource grants (e.g., D2D SA, etc.) to UEs requesting resources for D2D communications sessions.

Figure 10:
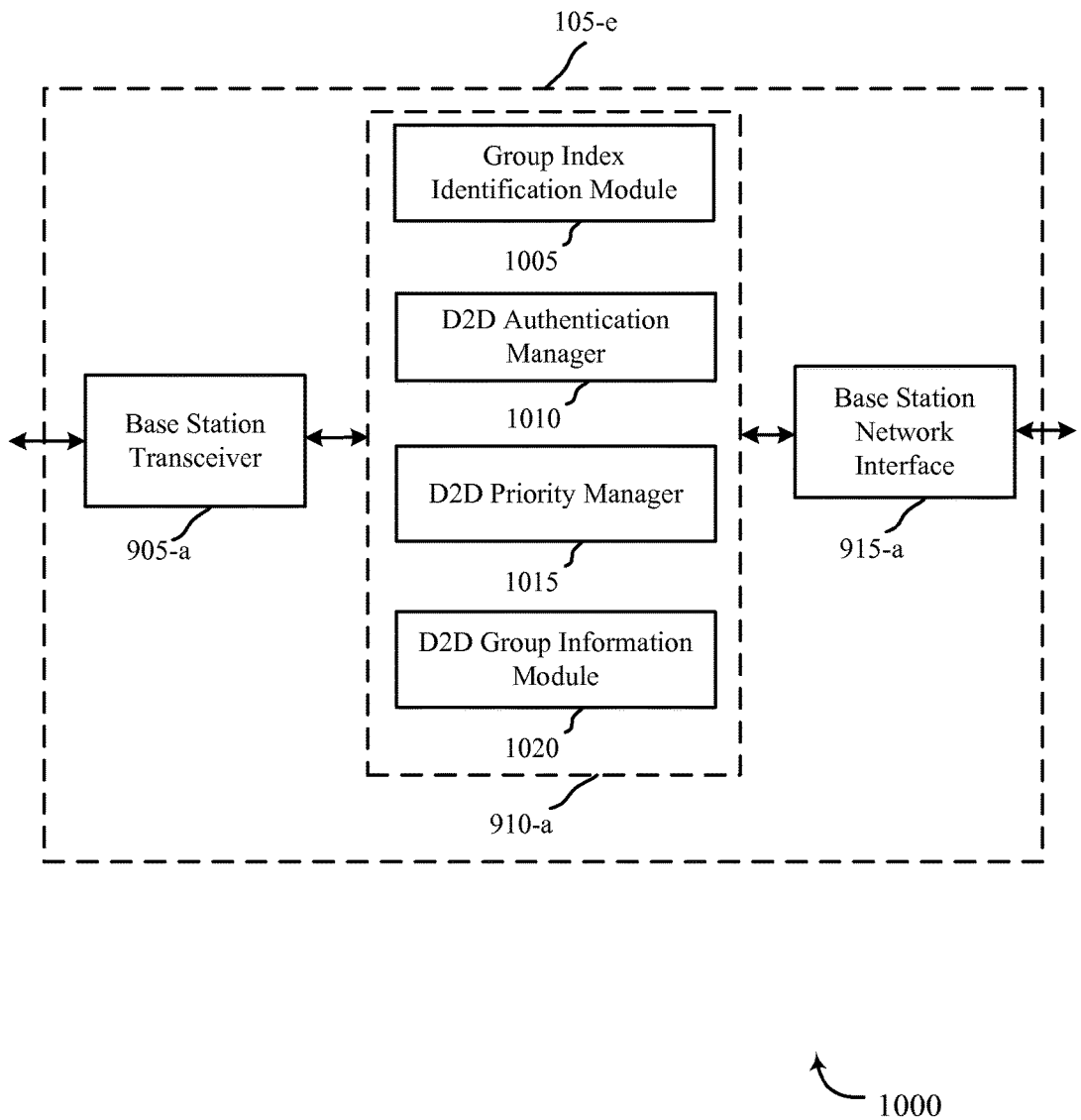
FIG. 10 shows a block diagram of a base station for supporting wireless D2D communication, in accordance with various aspects of the present disclosure.

FIG. 10 shows a block diagram 1000 of a base station 105-e for supporting wireless D2D communication, in accordance with various aspects of the present disclosure. The base station 105-e may be an example of one or more aspects of base stations 105 described with reference to FIGS. 1-3 and 9. The base station 105-e may include a base station transceiver 905-a, a D2D communications management module 910-a, and/or a base station network interface 915-a. The base station 105-e may also include a processor (not shown). Each of these components may be in communication with each other.

The base station transceiver 905-a and base station network interface 915-a may perform the features and functions described above with reference to the base station transceiver 905 and base station network interface 915 of FIG. 9.

The D2D communications management module 910-a may perform the features and functions described above with reference to the D2D communications management module 910 of FIG. 9. The D2D communications management module 910-a may include a group index identification module 1005, a D2D authentication manager 1010, a D2D priority manager 1015, and a D2D group information module 1020. Each of these components may be in communication with each other.

The group index identification module 1005 may identify group indexes for D2D communication sessions for groups (e.g., where each group is associated with a group ID code, etc.). In some examples, the group index identification module 1005 may assign group indexes for D2D communication sessions. For example, the group index identification module 1005 may maintain a set of group indexes and may, upon receiving a request from a UE 115 for initiating a D2D communication session associated with a group ID code, assign a currently unused group index for the D2D communication session. In other examples, the group index identification module 1005 may identify the group index based on network messaging exchanged (e.g., via base station network interface 915-a) for authentication and authorization of the D2D communication session. For example, group indexes may be statically or semi-statically assigned to group ID codes in the HSS and the HSS may provide a group index for a D2D communication session in a D2D authorization message associated with the D2D communication session. In yet other examples, the group index identification module 1005 may identify the group index in a message from the UE 115 initiating the D2D communication session.

The D2D authentication manager 1010 may exchange messaging (e.g., with an MME and/or HSS, etc.) to authenticate and authorize D2D communication sessions as described above. In some examples, the authentication and/or authorization messaging from an MME and/or HSS may include priority information (e.g., ARP information, etc.) of groups and UEs 115.

The D2D priority manager 1015 may manage resource allocation for D2D communication sessions based on priority information (e.g., from D2D authentication manager 1010) of groups associated with the communication sessions. In some examples, the D2D priority manager 1015 may manage resource allocations to UEs 115 requesting resources for D2D communication sessions (e.g., via D2D BSR messages, etc.) based on priority of the group and the relative priority of the requesting UE 115 within the group.

The D2D group information module 1020 may manage distribution of information related to active D2D communication sessions. For example, the D2D group information module 1020 may broadcast system information messaging (e.g., SIB, etc.) that includes the group indexes assigned to active D2D communication session. Additionally or alternatively, the D2D group information module 1020 may send paging messages (e.g., via base station transceiver 905-*a*) to other UEs 115 associated with groups that have active D2D communication sessions.

Figure 11:
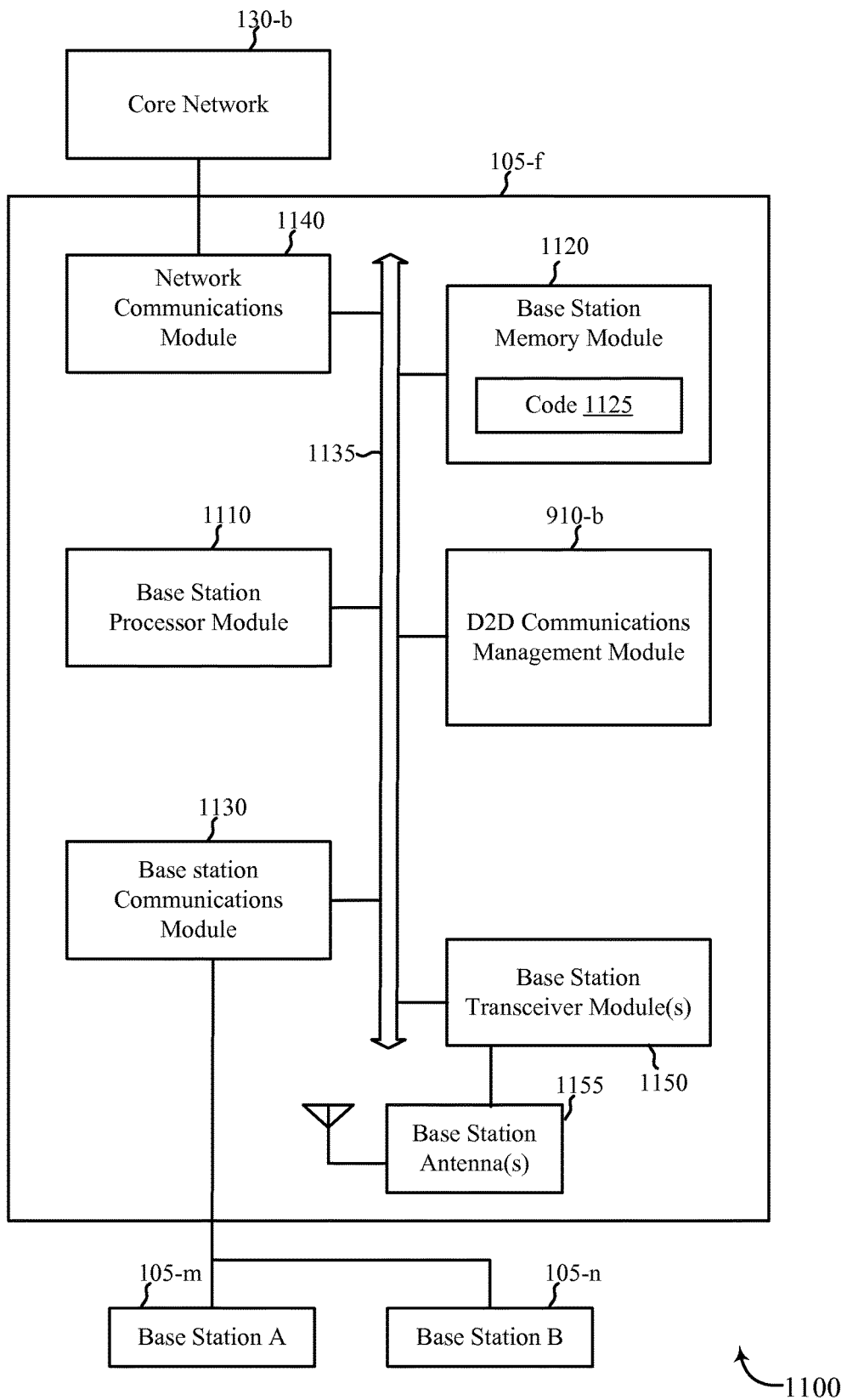
FIG. 11 shows a block diagram of a base station for supporting wireless D2D communication, in accordance with various aspects of the present disclosure.

FIG. 11 shows a block diagram 1100 of a base station 105-*f* (e.g., a base station forming part or all of an eNB) for supporting wireless D2D communication, in accordance with various aspects of the present disclosure. In some examples, the base station 105-*f* may be an example of aspects of one or more of the base stations 105 described with reference to FIGS. 1-3, 9 and/or 10. The base station 105-*f* may be configured to implement or facilitate at least some of the base station and/or apparatus features and functions described with reference to FIGS. 1-5, 9 and 10.

The base station 105-*f* may include a base station processor module 1110, a base station memory module 1120 (including software/firmware 1125), at least one or more base station transceiver module (represented by base station transceiver module(s) 1150), at least one or more base station antenna (represented by base station antenna(s) 1155), and/or a D2D communications management module 910-*b*. The base station 105-*f* may also include one or more of a base station communications module 1130 and/or a network communications module 1140. Each of these modules may be in communication with each other, directly or indirectly, over one or more buses 1135.

The D2D communications management module 910-*b* may be configured to perform and/or control some or all of the features and/or functions described above with reference to FIGS. 1-5, 9 and 10 related to receiving messaging from UEs to initiate D2D communication sessions, exchanging messaging with network entities (e.g., MME, HSS, etc.) related to authorization, authentication, and/or priority information for D2D communication sessions, identifying group indexes associated with D2D communication sessions (e.g., based on group ID code, etc.), managing resource allocations for D2D communication sessions according to group and/or UE priorities, and managing distribution of information related to active D2D communication sessions. In some examples, the D2D communications management module 910-*b* may be part of the software/firmware code 1125 and may include instructions that are configured to cause the base station processor module 1110 to perform various functions described herein. The D2D communications management module 910-*b* may be an example of the D2D communications management modules 1015 described with reference to FIGS. 9 and 10.

The base station memory module 1120 may include RAM and/or ROM. The base station memory module 1120 may store computer-readable, computer-executable software/firmware code 1125 containing instructions that are configured to, when executed, cause the base station processor module 1110 to perform various functions described herein. Alternatively, the computer-readable, computer-executable software/firmware code 1125 may not be directly executable by the base station processor module 1110 but be configured to cause the base station processor module 1110 (e.g., when compiled and executed) to perform various of the functions described herein.

The base station processor module 1110 may include an intelligent hardware device, e.g., a CPU, a microcontroller, an ASIC, etc. The base station processor module 1110 may process information received through the base station transceiver module(s) 1150, the base station communications module 1130, and/or the network communications module 1140. The base station processor module 1110 may also process information to be sent to the base station communications module 1130, for transmission to one or more other base stations 105-*m* and 105-*n*, and/or to the network communications module 1140 for transmission to a core network 130-*b*, which may be an example of one or more aspects of the core networks 130 described with reference to FIG. 1 or FIG. 2.

The base station transceiver module(s) 1150 may include a modem configured to modulate packets and provide the modulated packets to the base station antenna(s) 1155 for transmission, and to demodulate packets received from the base station antenna(s) 1155. The base station transceiver module(s) 1150 may, in some examples, be implemented as one or more base station transmitter modules and one or more separate base station receiver modules. The base station transceiver module(s) 1150 may be configured to communicate bi-directionally, via the antenna(s) 1155, with one or more UEs or apparatuses, such as one or more of the UEs 115 described with reference to FIGS. 1-3 and 6-8. The base station 105-*f* may, for example, include multiple base station antennas 1155 (e.g., an antenna array).

Figure 12:
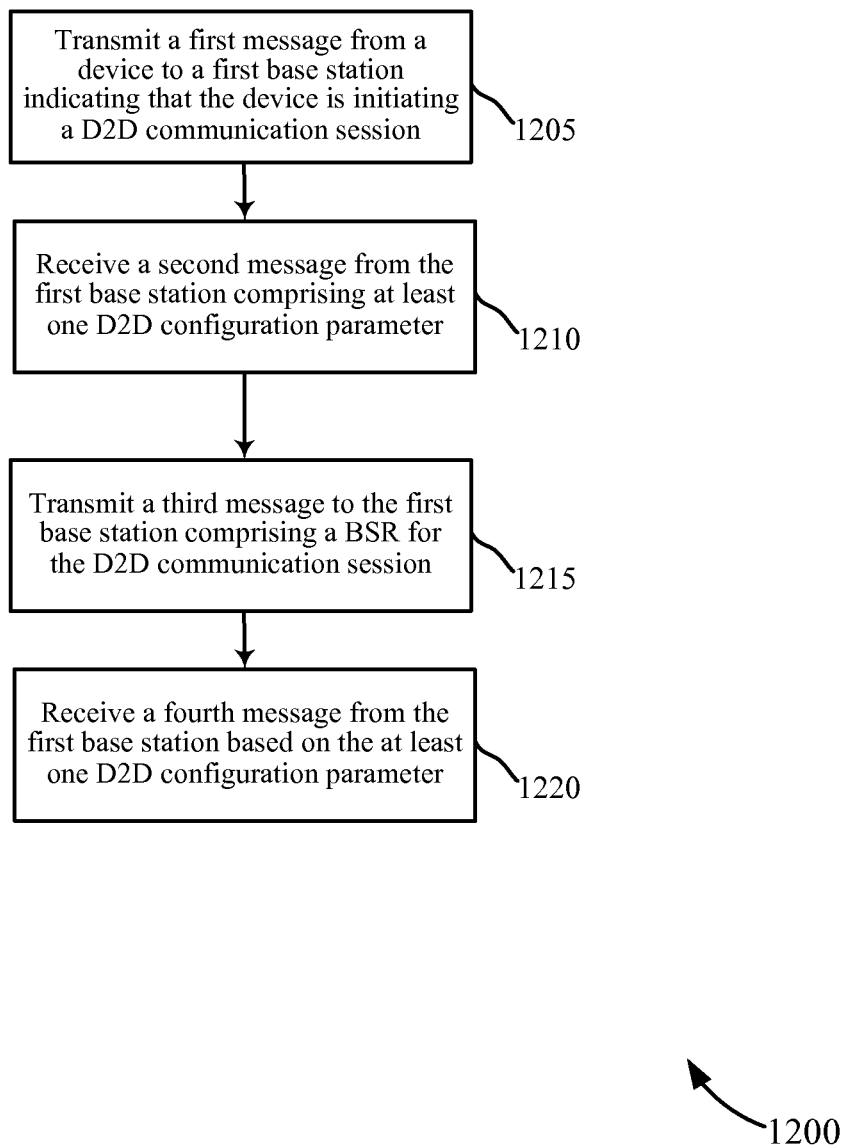
FIG. 12 shows a flowchart illustrating a method for wireless D2D communication, in accordance with various aspects of the present disclosure.

FIG. 12 shows a flowchart 1200 illustrating a method for wireless D2D communication, in accordance with various aspects of the present disclosure. The functions of flowchart 1200 may be implemented by a UE (i.e., a device) 115 or its components as described with reference to FIGS. 1-8. In certain examples, the blocks of the flowchart 1200 may be performed by a D2D configuration module 510, 810 with reference to FIGS. 5-8.

At block 1205, the device 115 may transmit a first message from a device to a first base station indicating that the device desires to initiate a D2D communication session. In some examples, the first message comprises a group ID code. In one example, the first message may be an RRC message. In some examples, transmission of the first message may be in response to selection of a D2D communication mode at the device 115. In certain examples, the functions of block 1205 may be performed by the initiation modules 605 as described above with reference to FIGS. 6-7.

At block 1210, the device 115 may receive a second message from the first base station comprising at least one D2D configuration parameter. The second message may include a D2D RNTI. In some examples, the D2D configuration parameter includes a D2D SPS RNTI. The second message may also include other RRC configuration parameters. In certain examples, the functions of block 12010 may be performed by the configuration parameter modules 610 as described above with reference to FIGS. 6-7.

At block 1215, the device 115 may transmit a third message to the first base station, the third message indicating that there is data to transmit for the D2D communication session. The third message may indicate that the device 115 has data to transmit for the D2D communication session. In some examples, the indication that there is data to transmit is a BSR for the D2D communication session. In some cases the group ID code, a group ID code index, or both is transmitted with the third message. In certain examples, the functions of block 1215 may be performed by the BSR module 615 as described above with reference to FIGS. 6-7.

At block 1220, the device 115 may receive a fourth message from the first base station that is transmitted according to the at least one D2D configuration parameter. For example, the fourth message may be scrambled with the D2D RNTI. In some examples, receiving the fourth message comprises descrambling the fourth message using the D2D RNTI. The use of the D2D RNTI to scramble the message may indicate to the device 115 that the message contains a grant of resources for a D2D SA and/or a D2D data transmission. In certain examples, the functions of block 1220 may be performed by the descrambling module 620 as described above with reference to FIGS. 6-7.

It should be noted that the method of flowchart 1200 is just one implementation and that the operations of the method, and the steps may be rearranged or otherwise modified such that other implementations are possible.

Figure 13:
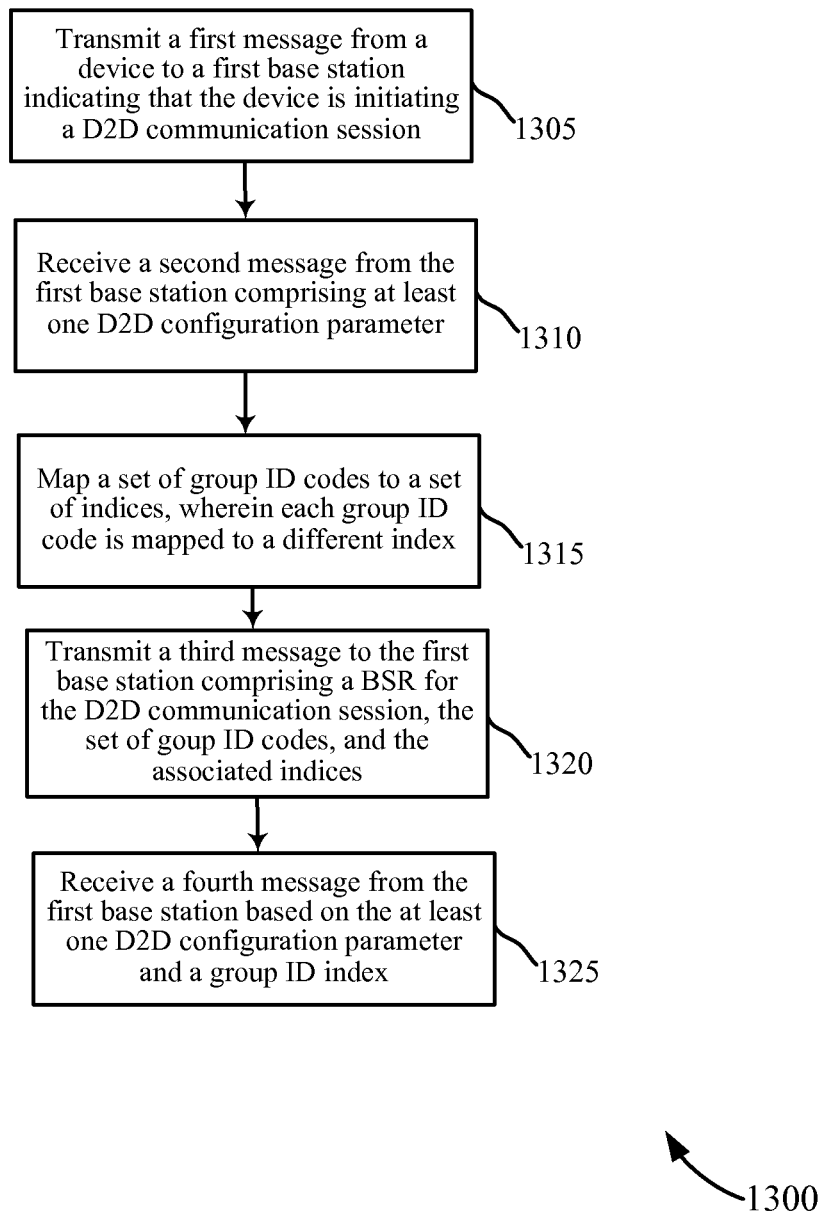
FIG. 13 shows a flowchart illustrating a method for wireless D2D communication, in accordance with various aspects of the present disclosure.

FIG. 13 shows a flowchart 1300 illustrating a method for wireless communication, in accordance with various aspects of the present disclosure. The functions of flowchart 1300 may be implemented by a UE 115 or its components as described with reference to FIGS. 1-8. In certain examples, the blocks of the flowchart 1300 may be performed by a D2D configuration module 510, 810 with reference to FIGS. 5-8. The method described in flowchart 1300 may also incorporate aspects of flowchart 1200 of FIG. 12.

At block 1305, the device 115 may transmit a first message from a device to a first base station indicating that the device desires to initiate a D2D communication session. In some cases the first message may include a group ID code for a group of devices that will be engaged in D2D communications, but in other cases the group ID code may be sent in the third message as indicated in block 1320, or in another message not indicated. In some cases, more than one group ID code will be sent. The group ID codes may be used to identify which D2D group are the subject of future D2D messages. For example, a public safety team may associate each device being used by a member of the team with a predefined group ID. In certain examples, the functions of block 1305 may be performed by the initiation module 605 as described above with reference to FIGS. 6-7.

At block 1310, the device 115 may receive a second message from the first base station comprising at least one D2D configuration parameter. The second message may include a D2D RNTI. In some examples, the D2D configuration parameter includes a D2D SPS RNTI. The second message may also include other RRC configuration parameters. In certain examples, the functions of block 1310 may be performed by the configuration parameter module 610 as described above with reference to FIGS. 6-7.

At block 1315, the device 115 may map a set of group ID codes to a set of indices, wherein each group ID code is mapped to a different index. For example, a device user may be engaged in D2D communications with more than one public safety team, and each team may have a unique predetermined group ID code to differentiate their communications. In certain examples, the functions of block 1315 may be performed by the group ID module 710 as described above with reference to FIGS. 6-7.

At block 1320, the device 115 may transmit a third message to the first base station, the third message comprising a BSR for the D2D communications session, the set of group ID codes, and the associated indices. In certain examples, the functions of block 1320 may be performed by the BSR module 615 as described above with reference to FIGS. 6-7.

At block 1325, the device 115 may receive a fourth message from the first base station that is transmitted based on the at least one D2D configuration parameter and a group ID index. For example, the fourth message may be scrambled with the D2D RNTI, and the group index may be used to identify the group that the message is for. In certain examples, the functions of block 1325 may be performed by the descrambling module 620 as described above with reference to FIGS. 6-7.

It should be noted that the method of flowchart 1300 is just one implementation and that the operations of the method, and the steps may be rearranged or otherwise modified such that other implementations are possible.

Figure 14:
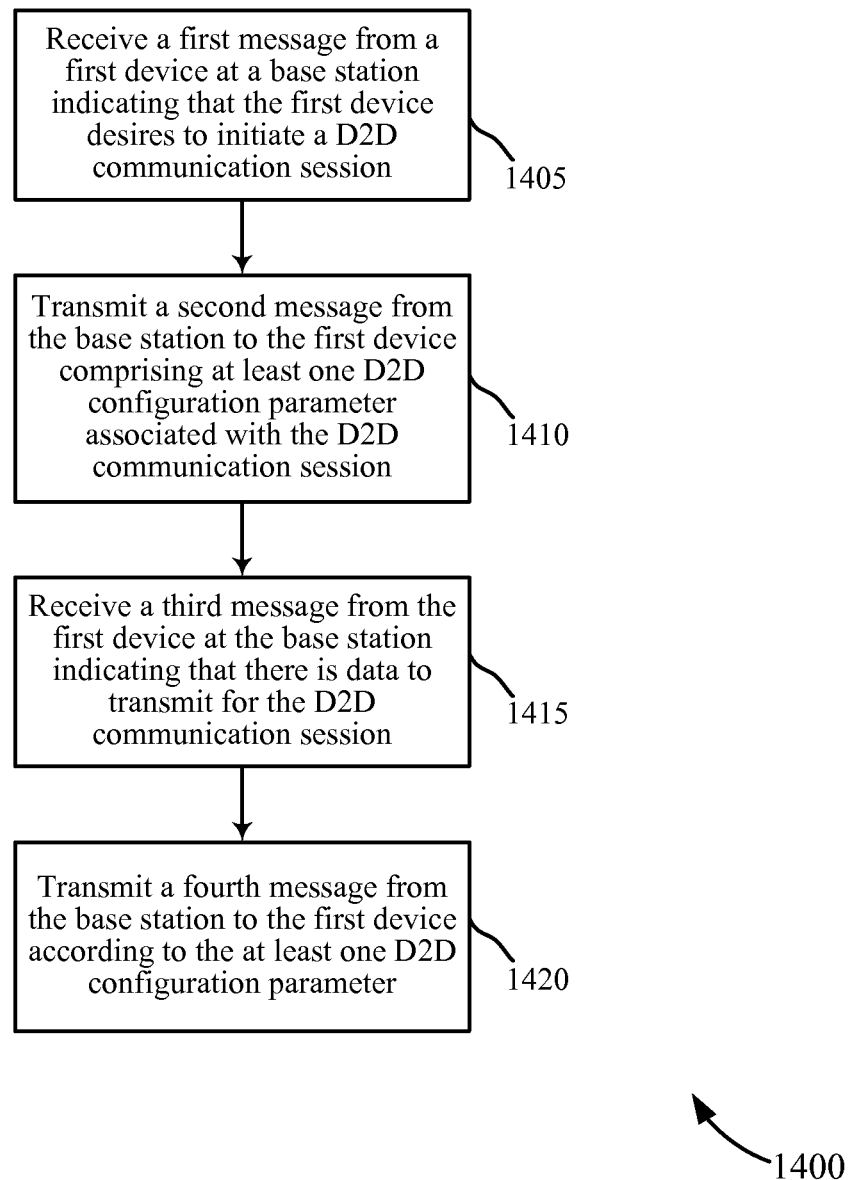
FIG. 14 shows a flowchart illustrating a method for wireless D2D communication, in accordance with various aspects of the present disclosure.

FIG. 14 shows a flowchart 1400 illustrating a method for wireless D2D communication, in accordance with various aspects of the present disclosure. The functions of flowchart 1400 may be implemented by a base station 105 (e.g., an eNB) or its components as described with reference to FIGS. 1-4 and 9-11. In certain examples, the blocks of the flowchart 1400 may be performed, or the components of a base station 105 may be controlled by a D2D communications management module 910 to perform these features.

At block 1405, a first message may be received at the base station 105 indicating that a first device desires to initiate a D2D communication session. In some cases, the first message may include a group ID code for the group of devices that will be engaged in D2D communications for the D2D communication session.

At block 1410, the base station may transmit a second message to the first device that includes at least one D2D configuration parameter associated with the D2D communication session. The at least one D2D configuration parameter may include an assigned group index for the D2D communication session, a D2D RNTI or D2D SPS RNTI for the D2D communication session, and the like.

At block 1415, the base station 105 may receive a third message from the first device indicating that there is data to transmit for the D2D communication session. The third message may include, for example, a D2D BSR and may identify the D2D communication session for which resources are requested by the group index.

At block 1420, the base station 105 may transmit a fourth message to the first device according to the at least one D2D configuration parameter. For example, the fourth message may be a D2D SA, D2D SPS activation message, or a grant of resources where the D2D SA is transmitted, and may be scrambled using a D2D RNTI or D2D SPS RNTI.

Figure 15:
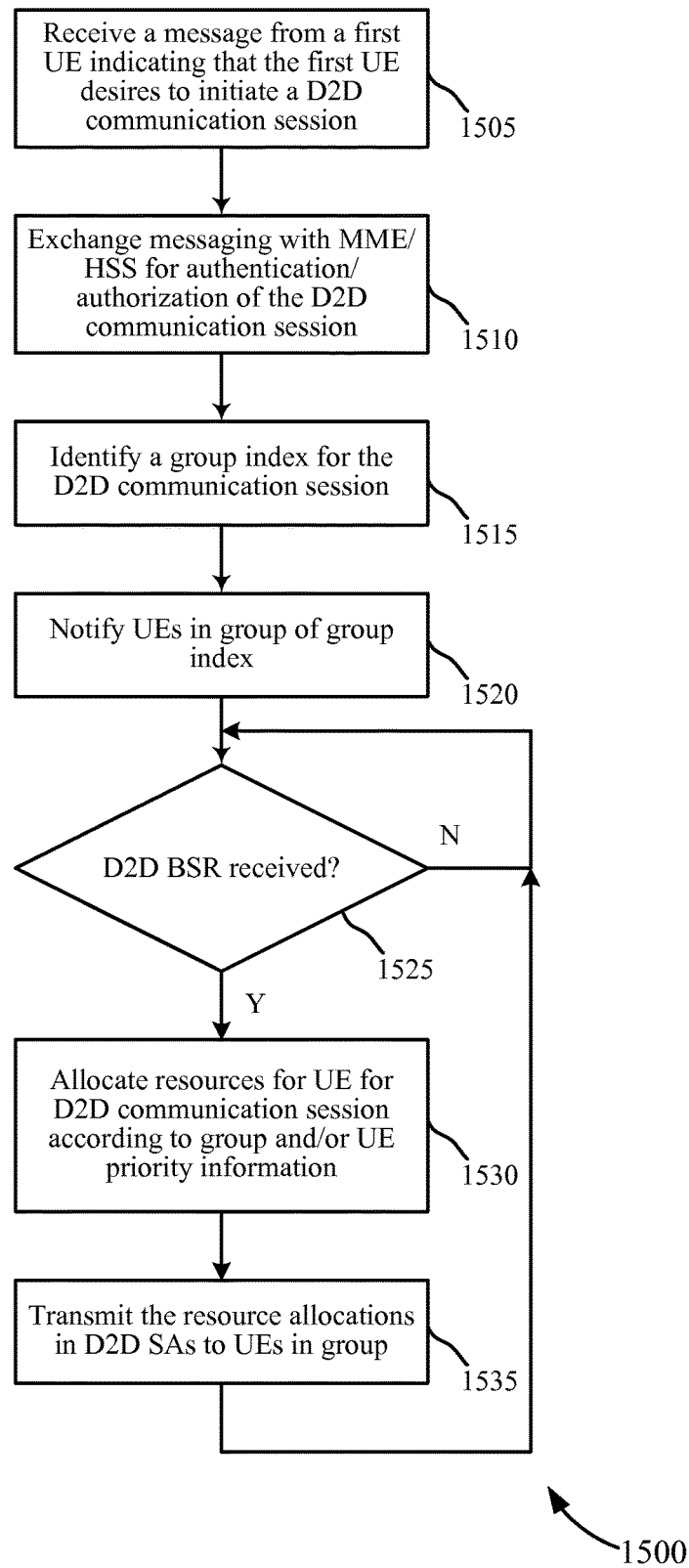
FIG. 15 shows a flowchart illustrating a method for wireless D2D communication, in accordance with various aspects of the present disclosure.

FIG. 15 shows a flowchart 1500 illustrating a method for wireless D2D communication, in accordance with various aspects of the present disclosure. The functions of flowchart 1500 may be implemented by a base station 105 (e.g., an eNB) or its components as described with reference to FIGS. 1-4 and 9-11. In certain examples, the D2D communications management modules 910 of FIGS. 9-11 may perform the blocks of the flowchart 1500, or may control the components of a base station 105 to perform these features.

At block 1505, the base station 105 may receive a message from a first UE indicating that the first UE desires to initiate a D2D communication session. In some cases, the first message may include a group ID code for the group of devices that will be engaged in D2D communications for the D2D communication session.

At block 1510, the base station 105 may exchange messaging with network entities (e.g., MME, HSS, etc.) to authenticate and authorize the D2D communication session. For example, the base station 105 may send a D2D session request message to an MME and/or HSS. The base station 105 may receive a D2D Authorization Message from the MME and/or HSS indicating that the D2D communication session is authenticated and authorized. The messaging from the MME and/or HSS may also provide priority information (e.g., ARP, etc.) for the group associated with the D2D communication session and/or UEs of the group.

At block 1515, the base station 105 may identify a group index for the D2D communication session. In some examples, the base station 105 may assign group indexes for D2D communication sessions. For example, the base station 105 may maintain a set of group indexes and may, upon receiving a request from a UE 115 for initiating a D2D communication session associated with a group ID code, assign a currently unused group index for the D2D communication session. In other examples, the base station 105 may identify the group index based on the network messaging exchanged in block 1510. For example, group indexes may be statically or semi-statically assigned to group ID codes in the HSS and the HSS may provide a group index for a D2D communication session in a D2D authorization message associated with the D2D communication session. In yet other examples, the base station 105 may identify the group index in a message from the UE 115 initiating the D2D communication session.

At block 1520, the base station 105 may notify UEs in the group of the active D2D communication session and group index associated with the D2D communication session. For example, the base station 105 may send a D2D Configuration Response to the UE that initiated the session. The base station 105 may notify other UEs of the group through system information messaging and/or paging messages.

At block 1525, the base station 105 may determine if D2D BSRs are received for active D2D communication sessions. If D2D BSRs are received, the base station may allocate resources for the UE for the D2D communication session according to group and/or UE priority information (e.g., received from the MME/HSS at block 1510) at block 1530. The base station 105 may communicate the resource allocations to the UEs 115 in D2D SAs at block 1535.

The detailed description set forth above in connection with the appended drawings describes examples and does not represent the only examples that may be implemented or that are within the scope of the claims. The term "example" and "exemplary," when used in this description mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as 'at least one of' or 'one or more of') indicates a disjunctive list such that, for example, a list of [at least one of A, B, or C] means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:
1. A method of wireless communication, comprising:
transmitting a first message from a device to a first base station, the first message indicating that the device desires to initiate a device-to-device (D2D) communication session, the first message comprising a group identification (ID) code;
receiving a second message from the first base station comprising a D2D radio network temporary identity (RNTI) and a group index associated with the group ID code, the group index assigned according to a priority level associated with the group ID code;

transmitting a third message to the first base station, the third message comprising an indication that there is data to transmit for the D2D communication session; and receiving a fourth message from the first base station that is transmitted according to the D2D RNTI.

2. The method of claim 1,
wherein the group ID code identifies a set of one or more devices engaging in the D2D communication session.

3. The method of claim 2, wherein the third message further comprises the group ID code.

4. The method of claim 2, further comprising:
mapping a set of group ID codes to a set of indices, wherein each group ID code is mapped to a different index.

5. The method of claim 4, wherein the fourth message comprises an index from the set of indices.

6. The method of claim 2, wherein the D2D communication session is identified in the third message according to the group index.

7. The method of claim 1, wherein the indication that there is data to transmit comprises a buffer status report (BSR).

8. The method of claim 1, wherein the receiving the fourth message comprises:
descrambling the fourth message using the D2D RNTI; and
obtaining resources for D2D communications based at least in part on the descrambling.

9. The method of claim 1, wherein the second message further comprises a D2D semi-persistent scheduling (SPS) RNTI.

10. The method of claim 9, further comprising:
receiving a D2D SPS activation message as part of the fourth message; and
transmitting a D2D SPS activation acknowledgement in response to the D2D SPS activation message.

11. The method of claim 1, wherein the second message further comprises a D2D radio resource control (RRC) configuration parameter.

12. The method of claim 1, further comprising:
performing a handover from the first base station to a second base station; and
continuing the D2D communication session while in a connected mode with the second base station, wherein a configuration context for the D2D communication session has been transmitted from the first base station to the second base station.

13. The method of claim 1, wherein the transmitting the first message is in response to a selection of a D2D communication mode at the device.

14. The method of claim 1, wherein the fourth message comprises a resource grant for a D2D scheduling assignment (SA) or a D2D data transmission.

15. An apparatus for wireless communication, comprising:
a processor;
memory in electronic communication with the processor; and
instructions stored in the memory, the instructions being executable by the processor to instruct the apparatus to:
transmit a first message from a device to a first base station, the first message indicating that the device desires to initiate a device-to-device (D2D) communication session, the first message comprising a group identification (ID) code;

receive a second message from the first base station comprising at least a D2D radio network temporary identity (RNTI) and a group index associated with the group ID code, the group index assigned according to a priority level associated with the group ID code;

transmit a third message to the first base station, the third message indicating that there is data to transmit for the D2D communication session; and receive a fourth message from the first base station that is transmitted according to the D2D RNTI.

16. A method of wireless communication, comprising:
receiving a first message from a first device at a base station, the first message indicating that the first device desires to initiate a device-to-device (D2D) communication session, the first message comprising a group identification (ID) code;

assigning a group index to the group ID code for the D2D communication session according to a priority level associated with the group ID code;

transmitting a second message from the base station to the first device, the second message comprising a D2D radio network temporary identity (RNTI) associated with the D2D communication session and the group index;

receiving a third message from the first device at the base station indicating that there is data to transmit for the D2D communication session; and transmitting a fourth message from the base station to the first device according to the D2D RNTI.

17. The method of claim 16, wherein the group ID code identifies a set of one or more devices engaging in the D2D communication session.

18. The method of claim 16, wherein assigning the group index to the group ID code for the D2D communication session comprises arranging the group index within a set of group indices for active D2D communication sessions according to the priority level associated with the group ID code.

19. The method of claim 16, further comprising:
broadcasting, from the base station, the group index associated with the group ID code in a system information message.

20. The method of claim 17, further comprising:
sending a D2D session request message to a subscription server for authorization for the D2D communication session; and
receiving D2D service information for the D2D communication session from the subscription server, the D2D service information based at least in part on a subscription profile of the first device.

21. The method of claim 20, wherein the D2D service information comprises any of the group index associated with the group ID code for the D2D communication session, group priority information associated with the group ID code, priority information for devices associated with the group ID code, or combinations thereof.

22. The method of claim 21, further comprising:
determining a resource allocation for the D2D communication session based at least in part on the group priority information.

23. The method of claim 22, wherein the fourth message comprises a first resource grant for first D2D data transmissions of the D2D communication session, and wherein the first resource grant is based at least in part on the determined resource allocation for the D2D communication session.

24. The method of claim 23, further comprising:
receiving, at the base station, an indication from a second device associated with the group ID code that the second device has data to transmit for the D2D communication session; and
transmitting, from the base station, a second resource grant to the second device for second D2D data transmissions of the D2D communication session.

25. The method of claim 24, wherein the first and second resource grants are based at least in part on respective user priority information associated with the first and second devices.

26. The method of claim 21, wherein the group priority information comprises an allocation retention priority (ARP) associated with the group ID code.

27. An apparatus for wireless communication, comprising:
a processor;
memory in electronic communication with the processor; and
instructions stored in the memory, the instructions being executable by the processor to instruct the apparatus to:
receive a first message from a first device at a base station, the first message indicating that the first device desires to initiate a device-to-device (D2D) communication session, the first message comprising a group identification (ID) code;
assign a group index to the group ID code for the D2D communication session according to a priority level associated with the group ID code;
transmit a second message from the base station to the first device, the second message comprising at least one D2D radio network temporary identity (RNTI) associated with the D2D communication session;
receive a third message from the first device at the base station indicating that there is data to transmit for the D2D communication session; and
transmit a fourth message from the base station to the first device according to the at least one D2D RNTI.

* * * * *